(12) United States Patent
Yamazaki et al.

(10) Patent No.: US 7,123,213 B2
(45) Date of Patent: *Oct. 17, 2006

(54) THREE DIMENSIONAL DISPLAY UNIT AND DISPLAY METHOD

(75) Inventors: Shunpei Yamazaki, Tokyo (JP); Yoshiharu Hirakata, Kanagawa (JP); Jun Koyama, Kanagawa (JP); Satoshi Teramoto, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 230 days.

This patent is subject to a terminal disclaimer.

(21) Appl. No.: 10/114,815

(22) Filed: Apr. 2, 2002

(65) Prior Publication Data
US 2002/0105483 A1 Aug. 8, 2002

(30) Foreign Application Priority Data

| Oct. 5, 1995 | (JP) | ............................. 7-284498 |
| Oct. 11, 1995 | (JP) | ............................. 7-290332 |
| Oct. 11, 1995 | (JP) | ............................. 7-290333 |

(51) Int. Cl.
*G09G 5/00* (2006.01)
*H04N 13/04* (2006.01)

(52) U.S. Cl. .................. 345/7; 345/5; 345/87; 348/56; 348/57

(58) Field of Classification Search ............. 345/7, 345/8, 87, 103, 5; 348/56, 57, 59, 51, 52, 348/55, 87; 349/5, 8, 9
See application file for complete search history.

(56) References Cited

U.S. PATENT DOCUMENTS

| 2,832,821 | A | * | 4/1958 | Du Mont ................... 348/835 |
| 3,621,127 | A | * | 11/1971 | Hope .......................... 352/57 |
| 3,858,001 | A | * | 12/1974 | Bonne ........................ 348/500 |
| 4,523,226 | A | * | 6/1985 | Lipton et al. ................. 358/88 |
| 4,562,463 | A | * | 12/1985 | Lipton ......................... 358/88 |
| 4,746,981 | A | | 5/1988 | Nadan et al. |
| 4,772,943 | A | * | 9/1988 | Nakagawa et al. ........... 358/92 |
| 4,870,486 | A | | 9/1989 | Nakagawa et al. |
| 4,875,036 | A | * | 10/1989 | Washizuka et al. ......... 345/104 |
| 5,049,987 | A | * | 9/1991 | Hoppenstein ................ 358/88 |
| 5,132,839 | A | * | 7/1992 | Travis ........................ 359/463 |
| 5,162,897 | A | | 11/1992 | Jitsukata et al. |
| 5,181,103 | A | * | 1/1993 | Tatsuya ....................... 348/658 |
| 5,448,257 | A | * | 9/1995 | Margeson et al. ........... 345/3.2 |
| 5,493,427 | A | | 2/1996 | Nomura et al. |
| 5,541,642 | A | * | 7/1996 | Ashbey ....................... 359/464 |
| 5,606,455 | A | * | 2/1997 | Eichenlaub ................. 359/463 |
| 5,724,063 | A | * | 3/1998 | Chee et al. ................. 345/103 |
| 5,821,989 | A | * | 10/1998 | Lazzaro et al. ............... 348/56 |

(Continued)

FOREIGN PATENT DOCUMENTS

EP 0 233 636 A2 8/1987

(Continued)

*Primary Examiner*—Dennis-Doon Chow
(74) *Attorney, Agent, or Firm*—Fish & Richardson P.C.

(57) ABSTRACT

In a structure in which six active matrix regions 103 to 108 are integrated on one glass substrate, horizontal scanning control circuits 101 and 102 are commonly disposed for the respective active matrix regions 103 to 105 and 106 to 108. Then, the horizontal scanning control circuits 101 and 102 are operated at different timings, and images formed by the active matrix regions 103 to 105 and 106 to 108 are synthesized and projected. With this operation, the horizontal scanning frequency required for one horizontal scanning control circuit can be made half of the horizontal scanning frequency of the display screen.

7 Claims, 19 Drawing Sheets

U.S. PATENT DOCUMENTS

| | | |
|---|---|---|
| 5,880,704 A | 3/1999 | Takezaki |
| 6,246,399 B1 * | 6/2001 | Yamane et al. ............. 345/211 |
| 6,580,479 B1 | 6/2003 | Sekiguchi et al. |
| 6,646,697 B1 | 11/2003 | Sekiguchi et al. |
| 6,937,301 B1 | 8/2005 | Sekiguchi et al. |
| 2002/0109808 A1 | 8/2002 | Sekiguchi et al. |

FOREIGN PATENT DOCUMENTS

| | | | |
|---|---|---|---|
| EP | 0 507 061 A2 | 10/1992 | |
| EP | 507061 * | 10/1992 | ................ 345/98 |
| EP | 927 917 | 7/1999 | |
| EP | 933 663 | 8/1999 | |
| JP | 62-065580 | 3/1987 | |
| JP | 62-091926 | 4/1987 | |
| JP | 62-191824 | 8/1987 | |
| JP | 03-089794 | 4/1991 | |
| JP | 3-119889 | 5/1991 | |
| JP | 03-134648 | 6/1991 | |
| JP | 04-107086 | 4/1992 | |
| JP | 5-216068 | 8/1993 | |
| JP | 06-078342 | 3/1994 | |
| JP | 06-167688 | 6/1994 | |
| JP | 06-236152 | 8/1994 | |
| JP | 06-250116 | 9/1994 | |
| JP | 06-273790 | 9/1994 | |
| JP | 6-308468 | 11/1994 | |
| JP | 06-335030 | 12/1994 | |
| JP | 6-347750 | 12/1994 | |
| JP | 07-092936 | 4/1995 | |
| JP | 07-253566 | 10/1995 | |
| JP | 08-340556 | 12/1996 | |
| JP | 2000-298273 | 10/2000 | |
| WO | WO99-004315 | 1/1999 | |

* cited by examiner

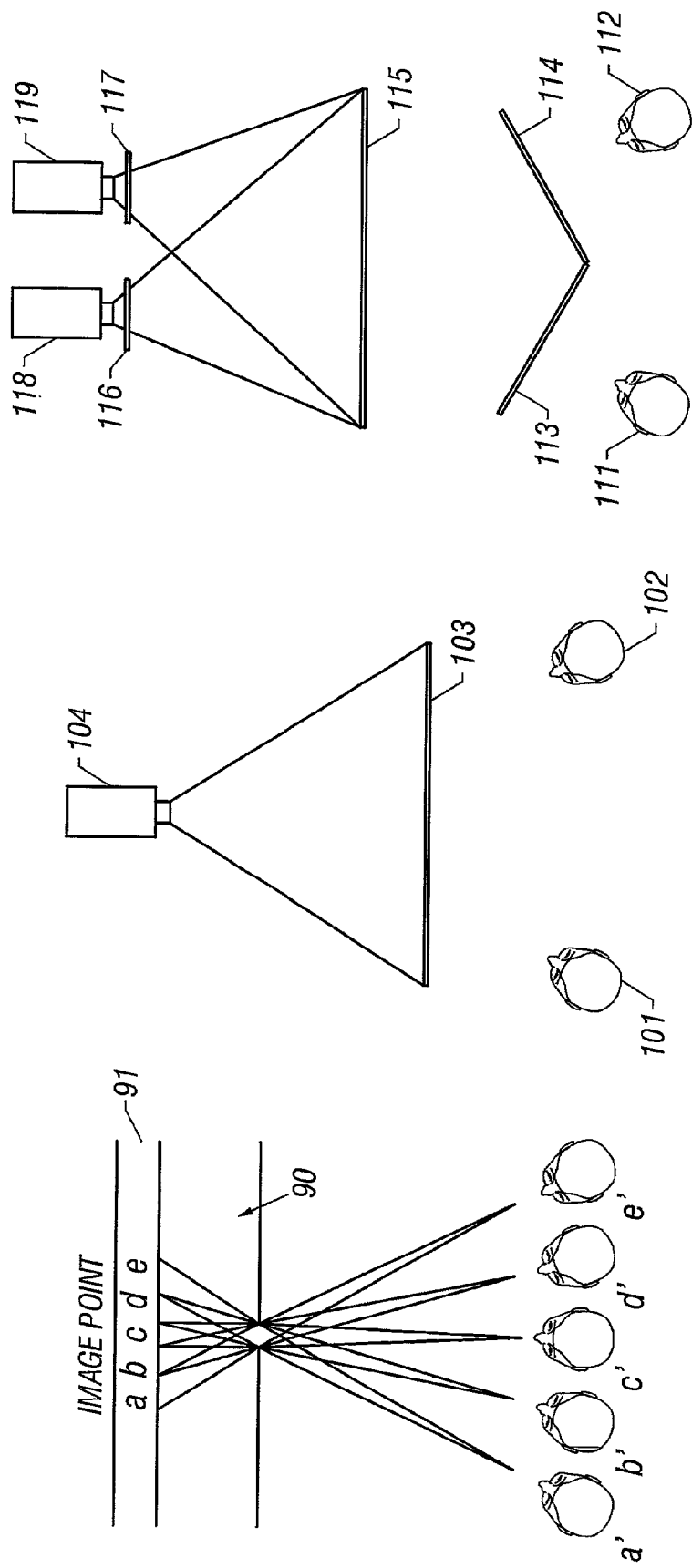

THREE DIMENSIONAL DISPLAY UNIT AND DISPLAY METHOD

BACKGROUND OF THE INVENTION

1. Field of the Invention

The present invention relates to a display unit and a display method for displaying a variety of information. In particular, the present invention relates to a display unit and a display method, through which being capable of recognizing different images from each other by a plurality of viewers. For example, the present invention relates to a display unit and a display method, through which being capable of viewing a plurality of images displayed on an identical screen by a plurality of observers independently from each other. Also, the present invention relates to a unit and a method, which selectively recognize and display only specific information from a plurality of images which are displayed simultaneously. Also, the present invention relates to a display unit and display method, through which being capable of selectively viewing only specific information. Then, the present invention relates to a display unit and a display method, through which being capable of converting an image recognized by a viewer into a three-dimensional image.

2. Description of the Related Art

Up to now, there have been known techniques by which different images are displayed on an identical screen. For example, there have been known a method of dividing one screen so as to display a large number of programs simultaneously, and a method of superimposing and displaying a plurality of images on one screen.

In the former method, since the respective images are displayed independently on the screen, a large number of programs and images can be viewed simultaneously with relative ease. However, in the latter method, a plurality of images are superimposed on each other, resulting in a program that make it difficult to view those images.

Moreover, in either case, since a plurality of images are displayed simultaneously, a viewer must select an object to be viewed.

This leads to a problem in the case where a plurality of viewers view a plurality of different screens simultaneously. For example, in the case of displaying an image which can be viewed by a viewer A but cannot be viewed by a viewer B, the above-mentioned method cannot be utilized.

Also, there has been known a technique by which a three-dimensional image (cubic image) is displayed as an image (refer to "Three-dimensional Display Unit" written by Chizuro Masuda, published by Sangyo Tosho Co., initially on May 25, 1990).

However, in the above-mentioned technique in which different images are viewed by a plurality of viewers simultaneously, there has not been known a technique in which a three-dimensional image can be viewed by them.

SUMMARY OF THE INVENTION

The present invention has been made in view of the above, and therefore an object of the present invention is to provide a structure by which a plurality of viewers can view different images displayed on an identical screen, independently. In other words, the object of the present invention is to provide the structure by which the images displayed on the identical screen can be selected individually and viewed.

Another object of the present invention is to provide a structure by which the above images can be converted into three-dimensional images, respectively.

Still another object of the present invention is to provide a display method by which the above problems are solved.

In order to solve the above problems, according to one aspect of the present invention, there is provided a display unit, through which being capable of viewing different images by a plurality of viewers, respectively, as shown in a specific example of FIG. 1, comprising:

means 11 for displaying a plurality of different images on an identical screen; and means 13 and 14 for selecting said plurality of images for each of the viewers.

The above display unit is designed so that two images which are displayed on a display unit 11 and divided with time are viewed through glasses 13 and 14 each having an optical shutter, thereby being capable of selectively viewing only a predetermined image.

FIG. 1 shows an example in which two images are viewed individually, and as time-division is more increased, more images can be viewed individually. The structure shown in FIG. 1 enables viewing a desired image by changing a timing of shuttering the glasses 13 or 14. Also, if a plurality of viewers use shutters having an identical timing, they can view an identical image simultaneously.

According to another structure of the present invention, there is provided, as shown in a specific example of FIG. 1, a display unit, through which being capable of viewing different images by a plurality of viewers, respectively, comprising means 11 for dividing a plurality of different images on an identical screen with time to display separated images; and means 13 and/or 14 having an optical shutter; wherein said means 13 and/or 14 having the optical shutter opens and/or shuts said optical shutter in synchronism with a timing at which the plurality of images are separated, and selectively transmits one of the images divided with time.

The above structure allows the glasses (for example, indicated by reference numeral 13) which is means having the optical shutter to be appropriately selected, thereby being capable of selectively recognizing only a required image. For example, the above structure can realize a situation in which only a specific person can view a specific image or only a specific person cannot view a specific image in a state where a plurality of persons view an identical screen.

According to still another structure of the present invention, there is provided, as shown in a specific example of FIG. 3, a display unit, through which being capable of viewing different images by a plurality of viewers, respectively, comprising means (CRT 21 in the figure) for dividing a plurality of different images on an identical screen with time to display separated images; and means (means which is made up of a polarizing plate 22, a π cell 23 and a ¼ wavelength plate 24, or means which is made up of a π cell 23 in the figure) for giving a different polarizing state to at least one of the separated images.

With the above structure, there can be obtained a unit which divides a plurality of images (may be two or more images) with time to display the separated images, and recognizes one of the images selectively by using a filter that gives a specific polarizing state to one of the separated images to selectively transmit the polarizing state.

For example, in the structure shown in FIG. 3, two images from a CRT 21, which are divided with time, are polarized counterclockwise or clockwise by a polarizing plate 22 and a ¼ wavelength plate 24. Then, a π cell 23 is used to further give a specific polarizing state to a specific image which is divided with time, thereby converting its polarizing state into a clockwise circular polarizing state. In this example, the use of clockwise circular polarizing glasses 25 and counterclockwise circular polarizing glasses 26 enables viewing selectively two images.

According to yet still another structure of the present invention, there is provided, as shown in a specific structure of FIG. 5, a display unit, through which being capable of viewing different images by a plurality of viewers, respectively, comprising means 31 and 32 for displaying two images having different polarizing states on an identical image 35; and means 36 and 37 for selectively transmitting said images having different polarizing states in correspondence with said plurality of viewers.

The structure shown in FIG. 5 is that two images projected from projecting units (for example, liquid-crystal projectors) 31 and 32 are projected on a screen 35 through polarizing plates 33 and 34 having different polarizing directions, respectively. Then, those images projected on the screen 35 are viewed through glasses 36 having a polarizing plate which is identical in polarizing direction with the polarizing plate 33 and glasses 37 having a polarizing plate which is identical in polarizing direction with the polarizing plate 34. As a result, display projected from the projecting unit 31 can be selectively viewed through the glasses 36. Also, display projected from the projecting unit 32 can be selectively viewed through the glasses 37.

In the above manner, one viewer wearing the glasses 36 and another viewer wearing the glasses 37 can view different images independently.

According to yet still another structure of the present invention, as shown by its principle in FIGS. 8A to 10, there is provided a display unit that displays images different depending upon visual points, using a lenticular lens 70 or a parallax barrier, which is characterized in that a non-display region that does not conduct display or a region where display of a predetermined background color is conducted is disposed between the respective display data which constitute different images.

In the above structure, the display data is defined as display of a minimum unit that constitutes a pixel or an image.

According to yet still another structure of the present invention, as shown by its operating timing in FIG. 2, a feature is that a screen on which a plurality of images which are divided with time are displayed is viewed intermittently at a timing which is identical with a timing when dividing the image with time, to thereby selectively recognize one of said plurality of images.

In other words, in a state where an image A which is made up of $A_0, A_1, \ldots$, and an image B which is made up of $B_0, B_1, \ldots$, are divided with time, as shown in FIG. 2, one viewer is allowed to recognize the image A which is made up of $A_0, A_1, \ldots$, whereas another viewer is allowed to recognize the image B which is made up of $B_0, B_1, \ldots$, through an optical shutter.

It is preferable to use an optical shutter which is as high as possible in response speed as means for viewing the image intermittently. Also, in order to allow the image to be recognized as a continuous image, it is necessary to take into consideration a period of time during which a residual image remains in setting a timing for viewing the image intermittently. Also, it is preferable to provide a period of time during which any image is not viewed in order to reduce the cross-talk of the different images. In other words, it is preferable to provide a period of time during which all of a plurality of optical shutters are shut.

According to yet still another structure of the present invention, as shown in the specific example of FIG. 5, a feature is that a screen 55 on which a plurality of images having different polarizing states are displayed is viewed through a plurality of polarizing filters 57 and 56 having different polarizing states, respectively, to thereby recognize said plurality of images, independently.

The structure shown in FIG. 5 uses a glasses-type polarizing filter. However, as another structure, polarizing filters as indicated by reference numerals 113 and 114 in FIG. 12 may be disposed before the eyes of viewers as if they look like screens.

According to yet still another structure of the present invention, as shown in the specific example of FIG. 5, a feature is that a screen 505 on which a plurality of images containing an image having a predetermined polarizing state are displayed is viewed through a filter 56 or 57 that selectively transmits said predetermined polarizing state, to selectively recognize only an image having said predetermined polarizing state.

According to another aspect of the present invention, there is provided a display unit, through which being capable of viewing different images by a plurality of viewers, respectively, comprising:

means for forming an image which is optically modulated by an integrated liquid-crystal panel;

means for displaying a plurality of different images on an identical screen; and means for selecting said plurality of images for each of the viewers;

wherein said integrated liquid-crystal panel is so arranged as to provide active matrix regions where images of M×N are formed, and a region having peripheral circuits of M+N on a substrate, assuming that M and N are natural numbers of 2 or more;

wherein said M– peripheral circuits conduct horizontal scanning control of the N– active matrix regions simultaneously; and wherein said N– peripheral circuits conduct vertical scanning control of the M– active matrix regions simultaneously.

According to another structure of the present invention, there is provided a display unit, through which being capable of viewing different images by a plurality of viewers, respectively, comprising:

means for forming an image which is optically modulated by an integrated liquid-crystal panel;

means for dividing a plurality of different images on an identical screen with time to display separated images; and means having an optical shutter;

wherein said integrated liquid-crystal panel is so arranged as to provide active matrix regions where images of M×N are formed, and a region having peripheral circuits of M+N on a substrate, assuming that M and N are natural numbers of 2 or more;

wherein said M– peripheral circuits conduct horizontal scanning control of the N– active matrix regions simultaneously;

wherein said N– peripheral circuits conduct vertical scanning control of the M– active matrix regions simultaneously; and wherein said means having said optical shutter opens and shuts said optical shutter in synchronism with a timing at which the image is separated, to selectively transmit one of the images divided with time.

According to still another structure of the present invention, there is provided a display unit, through which being capable of viewing different images by a plurality of viewers, respectively, comprising:

means for forming an image which is optically modulated by an integrated liquid-crystal panel;

means for dividing a plurality of different images on an identical screen with time to display separated images; and means for giving a different polarizing state to at least one of the separated images;

wherein said integrated liquid-crystal panel is so arranged as to provide active matrix regions where images of M×N are formed, and a region having peripheral circuits of M+N on a substrate, assuming that M and N are natural numbers of 2 or more;

wherein said M− peripheral circuits conduct horizontal scanning control of the N− active matrix regions simultaneously; and wherein said N− peripheral circuits conduct vertical scanning control of the M− active matrix regions simultaneously.

According to still another aspect of the present invention, there is provided a display unit, through which being capable of viewing different images by a plurality of viewers, respectively, comprising:

means for displaying a plurality of different images on an identical screen;

means for selecting said plurality of images for each of the viewers; and means for converting the image viewed by each of the viewers into a three-dimensional display.

A specific example of the above structure is shown in FIGS. 18 to 20. The structure shown in FIGS. 19A to 19C forms a three-dimensional image (cubic image) by a control circuit 511 the details of which are shown in FIG. 18 and an integrated liquid-crystal panel 507 controlled by the control circuit 511 which is shown in FIG. 14, to use the selection of a predetermined polarizing state and the time-division system together, thereby being capable of providing three-dimensional images which are different between two viewers or viewers separated into two groups.

According to another structure of the present invention, there is provided a display unit, through which being capable of viewing different images by a plurality of viewers, respectively, comprising: means for displaying a plurality of different images on an identical screen; means for selecting said plurality of different images for each of the viewers; and means for selecting the images which can be viewed by each of the viewers from two-dimensional display or three-dimensional display.

The above structure is characterized in that, in the structure shown in an example of FIGS. 18 to 20, in particular, in a control circuit shown in FIG. 18, a two-dimensional image and a three-dimensional image can be appropriately selected.

According to still another structure of the present invention, a feature is to comprise: means for forming a plurality of images which are divided with time, respectively; means for giving different polarizing states to one and others of said plurality of images, respectively; means for superimposing said plurality of images on each other to project the superimposed images; means for dividing the images which are divided with time by an optical shutter; and means for selectively transmitting said different polarizing states, respectively.

A specific example of the above structure is shown in FIGS. 18 to 20. In the structure shown in FIGS. 18 to 20, two color images which are divided with time are formed by a liquid-crystal panel 511 (its details are shown in FIG. 14) shown in FIGS. 19A to 19C, and then allowed to be transmitted through polarizing plates 512 and 513 or appropriate polarization states to those two color images. Then, those images are reflected from an optical system 508 by a mirror 509 so as to be superimposedly projected on a screen 510, and the images projected on the screen 510 are selected by polarizing plates 404, 405 and liquid-crystal shutters 406, 407. In this manner, the viewer wearing the glasses 402 can view a predetermined three-dimensional image.

According to yet still another structure of the present invention, there is provided a method of displaying 2n-kinds of different images on an identical screen, assuming that n is a natural number of 1 or more, in which said 2n-kinds of different images are separated into n-images by time-division, and also separated by giving two polarizing states thereto.

A specific example of the above structure is shown in FIG. 23. What is shown in FIG. 23 is an operating timing chart in the case of operating the structure shown in FIG. 22. FIG. 23 shows an example in which three-dimensional images indicated by symbols A, B and C are displayed and then separated, respectively.

Since the three-dimensional image requires two images for a viewer's right eye and left eye, when three-dimensional images are displayed, independent images of 6 kinds of 2×3 are required. In the case of conducting the operation shown in FIG. 23, this is a case of n=3.

In the operation shown in FIG. 23, the images are divided with time by the operation of an optical shutter into $A_{01}, A_{02}$, further $B_{01}, B_{02}$, still further $C_{01}, C_{02}$. Further, $A_{01}$ and $A_{02}$ are separated, further $B_{01}$ and $B_{02}$ are separated, still further $C_{01}$ and $C_{02}$ are separated, by a filter that selectively transmits two polarizing states. In this way, for each of three viewers (or a plurality of viewers which are separated into three groups), there can be provided an image for his right eye and an image for his left eye. Thus, those three-dimensional images can be viewed by the individual viewers.

According to yet still another structure of the present invention, there is provided a method of projecting one image consisting of R, G and B, and the other image consisting of R', G' and B' on an identical projection plane, which is characterized in that different polarizing states are given to said one image and said other image, and each of said one image and said other image is further made up of a plurality of different images which are divided with time.

According to yet still another structure of the present invention, there is provided a method of projecting first images which have a first polarizing state and are divided with time into a right-eye image and a left-eye image, and second images which have a second polarizing state different from said first polarizing state and are divided with time into a right-eye image and a left-eye image on an identical projection plane, which is characterized in that said first images are selectively transmitted by optical means for selectively transmitting said first polarizing state, and said first image transmitted is viewed by right and left eyes of a viewer while being divided with time by using an optical shutter, to thereby selectively obtain a first three-dimensional image; and said second images are selectively transmitted by optical means for selectively transmitting said second polarizing state, and said second image transmitted is viewed by right and left eyes of the viewer while being divided with time by using an optical shutter, to thereby selectively obtain a second three-dimensional image.

A specific example of the above structure is shown in FIG. 21. FIG. 21 shows images $A_i$ and $B_i$ (i is a natural number containing 0) having a first polarizing state, and images $C_i$ and $D_i$ having a second polarizing state. A, B and C, D represent images for right eyes and images for left eyes.

The first polarizing states indicated by $A_i$ and $B_i$ are selectively transmitted by polarizing plates 404 and 405 shown in FIG. 20, and the image thus transmitted is divided with time by liquid-crystal shutters (optical shutters) 406 and 407, to thereby obtain the image $A_i$ for the right eye and the image $B_i$ for the left eye.

The second polarizing states indicated by $C_i$ and $D_i$ are selectively transmitted by polarizing plates 408 and 409 shown in FIG. 20, and the image thus transmitted is divided with time by liquid-crystal shutters (optical shutters) 410 and 411, to thereby obtain the image $C_i$ for the right eye and the image $D_i$ for the left eye.

According to yet still another structure of the present invention, there is provided a method of projecting first images which have a first polarizing state and are divided with time into a right-eye image and a left-eye image, and second image which have a second polarizing state different from said first polarizing state and are divided with time into a right-eye image and a left-eye image on an identical projection plane, which is characterized in that said first and second images are obtained as images which have two different polarizing states and are superimposed on each other by using an optical shutter, and those images are separated into an image for a viewer's right eye and an image for his left eye by first optical means for selectively transmitting said first polarizing state and second optical means for selectively transmitting said second polarizing state.

As a specific example of the above structure, there is shown a case in which a positional relation between a polarizing plate and a liquid-crystal shutter on the portion of glasses is exchanged in the structure shown in FIG. 20.

According to yet still another structure of the present invention, there is provided a method of obtaining, as a first three-dimensional image and a second three-dimensional image, first images having a first polarizing state, which are obtained by dividing with time and displaying a plurality of different three-dimensional images for a viewer's right eye and his left eye, and second images having a second polarizing state different from said first polarizing state, which are obtained by dividing with time and displaying a plurality of different three-dimensional images for a viewer's right eye and his left eye, which is characterized in that a specific image which is divided with time from said first and second images is selected by an optical shutter, an image for his right eye or his left eye is obtained by optical means that selectively transmits said first polarizing state from said selected image, and an image for his right eye or his left eye is obtained by optical means that selectively transmits said second polarizing state from said selected image.

An operating timing chart of a specific example of the above structure is shown in FIG. 23. What is shown in FIG. 23 is an operating timing chart in the case of operating the structure shown in FIG. 22.

In the operation shown in FIG. 23, a display screen 1 and a display screen 2 have different polarizing states. On the display screen 1 are displayed images for viewer's right eye of three-dimensional images A, B and C. On the display screen 2 are displayed images for his left eye of those three-dimensional images A, B and C.

First, an image for his right eye and an image for his left eye of the image A are selected by a liquid-crystal shutter (optical shutter) shown in FIG. 22. For example, the image for his right eye of the image A is indicated by $A_{01}$ whereas the image for his left eye of the image A is indicated by $A_{02}$. Similarly, the images for his right eye and the images for high left eye, of the images B and C are selected by the liquid-crystal shutter.

Then, the image $A_0$ for his right eye and the image $A_{02}$ for his left eye are separated from each other using a polarizing plate which is means for selectively transmitting the respective polarizing states. In this manner, the images for his right eye and the images for his left eye, of the respective images A, B and C can be selected individually. Thus, three-dimensional images can be viewed by three viewers (or a plurality of viewers which are separated into three groups), individually.

According to yet still another aspect of the present invention, there is provided a method of obtaining, as a first three-dimensional image and a second three-dimensional image, first images having a first polarizing state, which are obtained by dividing with time and displaying a plurality of different three-dimensional images for a viewer's right eye and his left eye, and second images having a second polarizing state different from said first polarizing state, which are obtained by dividing with time and displaying a plurality of different three-dimensional images for a viewer's right eye and his left eye, which is characterized in that said first images are obtained by optical means that transmits said first polarizing state, an image for his right eye or left eye of a specific image is obtained by dividing said first images with time by an optical shutter, said second images are obtained by optical means that transmits said second polarizing state, and an image for his left eye or right eye of a specific image is obtained by dividing said second images with time by an optical shutter.

As a specific example of the above structure, there is shown a case in which a positional relation between a polarizing plate and a liquid-crystal shutter is exchanged in the structure shown in FIG. 22.

For facilitation of understanding the present invention described in this specification, an example of a timing chart shown in FIG. 23 is described. What is shown in FIG. 23 is an example in which three-dimensional images A, B and C are displayed on an identical screen, and then separated, respectively, so as to be viewed by three viewers.

For example, the three-dimensional image indicated by A includes an image for his right eye of the image A, which is made up of a frame $A_{i1}$ and an image for his left eye of the image A, which is made up of a frame $A_{i2}$, assuming that i is a natural number including 0.

The display screen 1 and the display screen 2 have different polarizing states, respectively. For example, the different polarizing states are given to the display screens 1 and 2 such that the display screen 1 has vertical polarization whereas the display screen 2 has horizontal polarization.

For example, a viewer that wants to selectively view the image A puts on glasses indicated by reference numeral 601 in FIG. 22 to view a screen 510. The display screen 1 and the display screen 2 in FIG. 23 are superimposedly displayed on the screen 510.

In this situation, liquid-crystal shutters 604 and 605 provided on the glasses 601 are opened/shut simultaneously, thereby allowing only a frame of the image A to be selectively transmitted. Then, an image $A_{i1}$ for his right eye and an image $A_{i2}$ for his left eye are separated from each other by a polarizing plate 603 that allows the polarizing state of the display screen 1 to be transmitted. In this way, the viewer who puts on the glasses 601 can selectively view the three-dimensional image A.

Different images which are divided with time are displayed on an identical screen, and those different images are appropriately selected using an optical shutter, thereby being capable of selecting the different images for each of a plurality of viewers. Then, the different images can be viewed simultaneously by the plurality of viewers. Also, the plurality of images are separated to be displayed while being changed in polarizing state with time, and then those images are viewed through filters that transmit specific polarizing states, respectively. As a result, the viewers can selectively view the respective images. Furthermore, the image can be exhibited to the viewers as a cubic image.

Further, two images different in polarizing state are displayed on an identical screen, and those images are viewed using optical means that selectively transmits the respective different polarizing states so that the viewer can view the different images. In other words, the images displayed on the identical screen can be viewed independently and simultaneously by a plurality of viewers. Moreover, the images can be exhibited to the viewers as a cubic image.

Further, a plurality of images are separated and displayed using a lenticular screen, thereby being capable of viewing the different images by a plurality of viewers, independently.

Further, a plurality of images are separated and displayed using a parallax barrier, thereby being capable of viewing the different images by a plurality of viewers, independently.

In this manner, a plurality of images are displayed on an identical screen simultaneously, and those images are separated through a method of dividing the images with time, a method of using a polarizing state, or a method using a lenticular screen or a parallax barrier, so as to be viewed independently.

Using the above methods, the different images can be displayed on the identical screen for each of a plurality of viewers.

Also, the above structure can be used to provide information to only a specific viewer among a plurality of viewers. The above structure may be applied for a variety of information display means, play devices, device for education or study, etc. In other words, taking such an advantage that different images can be viewed for each of viewers, the above structure can be used for selectively providing a variety of information or images to a plurality of viewers.

The above and further objects, features and advantages of the invention will appear more fully from the accompanying drawings and the following detailed description.

BRIEF DESCRIPTION OF THE DRAWINGS

FIG. 10 shows an example in the case of displaying a plurality of images, using a parallax barrier;

FIG. 11 is a diagram showing the outline of a structure that displays a plurality of images using a lenticular lens or a parallax barrier;

FIG. 12 is a diagram showing the outline of a structure that displays a plurality of images using different polarizing states;

DETAILED DESCRIPTION OF THE PREFERRED EMBODIMENTS

Now, a description will be given in more detail of embodiments of the present invention with reference to the accompanying drawings.

(First Embodiment)

A first embodiment relates to a structure in which a plurality of images are divided with time and displayed on an identical screen, and then one of those divided images are selected using an optical shutter so that the different images can be viewed by a plurality of viewers, independently.

Figure 1:
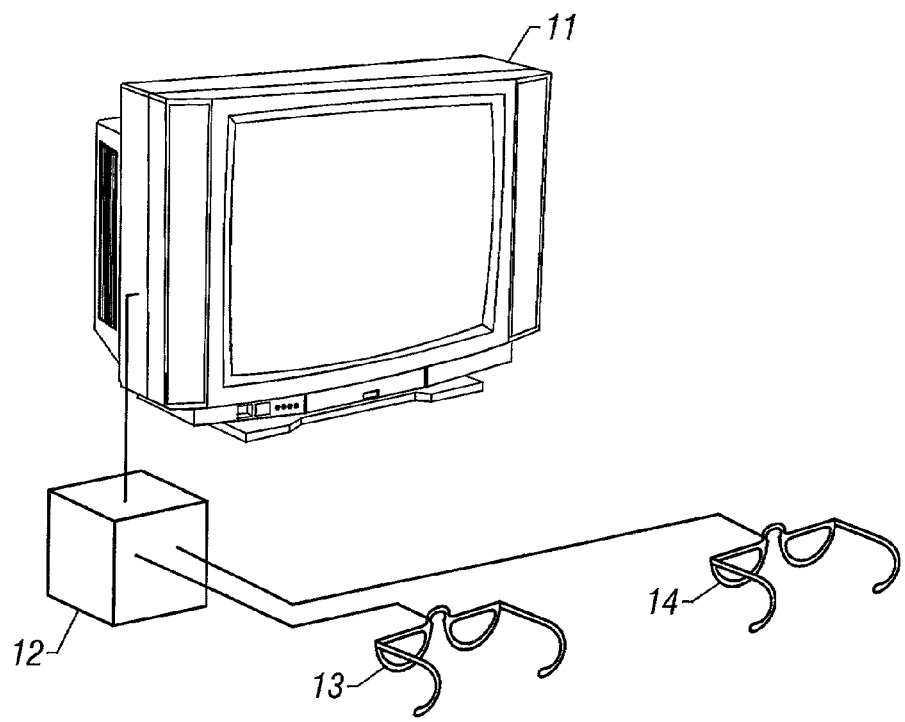
FIG. 1 is a diagram showing the outline of a display unit, through which being capable of viewing different images by a plurality of viewers simultaneously, using a time division display.

FIG. 1 shows an outline of the structure of a display unit in accordance with this embodiment. The structure shown in FIG. 1 relates to the structure in which images which are divided with time and displayed on a screen of a display 11 are viewed using glasses 13 and 14 having liquid-crystal shutters whereby viewers using the respective glasses can view the respective different images.

Figure 2:
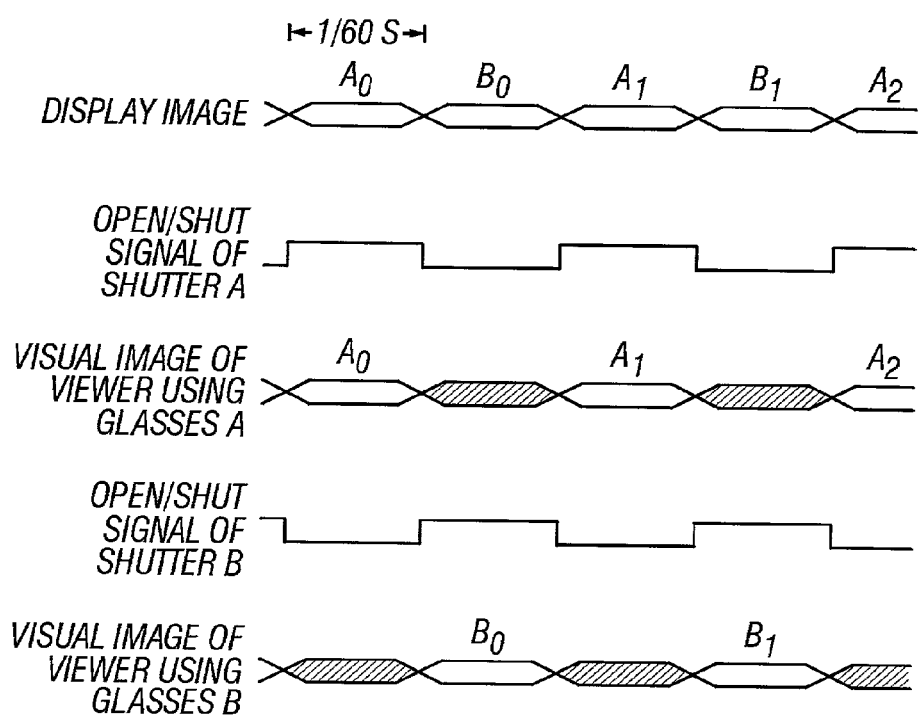
FIG. 2 is a diagram showing an example of an operating timing chart when the structure shown in FIG. 1 is operated.

FIG. 2 shows an operating timing chart used when operating the structure shown in FIG. 1. As shown in FIG. 2, an image A and an image B are alternately displayed every two frames on a screen 11 which is a display screen.

In order to maintain an image quality to a certain level or more, a period of time for one frame is preferably set to ⅟₆₀ (s) or shorter, and more preferably if it is ⅟₁₂₀ (s) or shorter, flicker or the like can be prevented.

If this screen is viewed directly, the images A and B are viewed, superimposed on each other. Therefore, in the structure shown in FIG. 1, using the glasses 13 and 14 having liquid-crystal shutters that select transmission or non-transmission in synchronism with the display timing so that the viewers who put on the respective glasses can view the images A and B as if the images A and B are separated from each other. It should be noted that the liquid-crystal shutters of the respective glasses are appropriately controlled by a control unit 12 in accordance with the display state of the screen. Also, although being not shown in FIG. 2, the open/shut time for the shutter is preferably shorter than the display time for one frame.

As shown in FIG. 2, when the image $A_0$ is being displayed, the liquid-crystal shutter of the A-glasses 13 is opened so that a viewer who puts on the A-glasses can view the display of $A_0$. Also, since the liquid-crystal shutter of the B-glasses 14 is shut, a viewer who puts on the B-glasses cannot view the display of $A_0$.

Conversely, when the image $B_0$ of the subsequent frame is being displayed, the liquid-crystal shutter of the B-glasses 14 is opened so that a viewer who puts on the B-glasses can view the display of $B_0$. Also, since the liquid-crystal shutter of the A-glasses 13 is shut, a viewer who puts on the A-glasses cannot view the display of $B_0$.

In this way, images A and B are alternately displayed while the liquid-crystal shutters of the A-glasses and the B-glasses are alternately switched between the open state and the close state. With this operation, the viewer who puts on the A-glasses 13 can selectively view images indicated by $A_0$, $A_1$, $A_2$, $A_3$, . . . whereas the viewer who puts on the B-glasses 14 can selectively view images indicated by $B_0$, $B_1$, $B_2$, $B_3$, . . . .

In this way, while viewing the identical screen 11, the viewer who puts on the A-glasses 13 and the viewer who puts on the B-glasses 14 can view different images, respectively.

It should be noted that the open/shut scanning operation of the liquid-crystal shutters of the respective glasses is conducted by the application of a signal from the control unit 12. A method of supplying the signal may be a method using a connection code which is applied to this embodiment, or a method using a wireless system with electromagnetic waves or ultrasonic waves.

(Second Embodiment)

A second embodiment is characterized in that an image a polarizing state of which is clockwise circular polarization and an image a polarizing state of which is counterclockwise circular polarization are switched with time-division and displayed, and those images are viewed through glasses (clockwise circular polarization glasses) which transmit the clockwise circular polarization and glasses (counterclockwise circular polarization glasses) which transmit the counterclockwise circular polarization, whereby the image of the clockwise circular polarization glasses is selectively recognized through the clockwise circular polarization glasses, and the image of the counterclockwise circular polarization glasses is selectively recognized through the counterclockwise circular polarization glasses.

Figure 3:
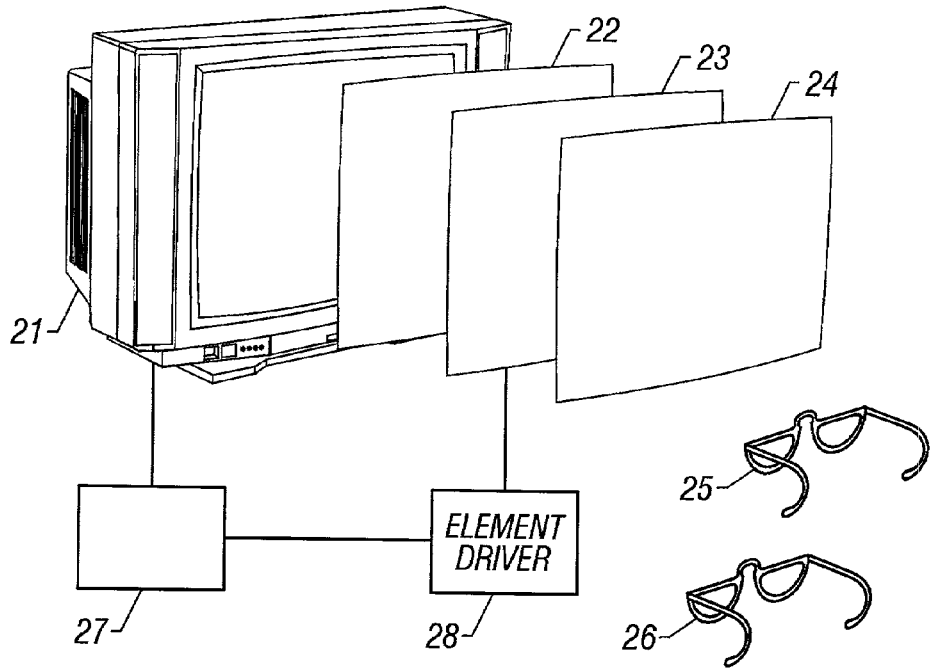
FIG. 3 is a diagram showing the outline of a display unit, through which being capable of viewing different images by a plurality of viewers simultaneously, with a change of the polarizing state by a time-division display.
Figure 4:
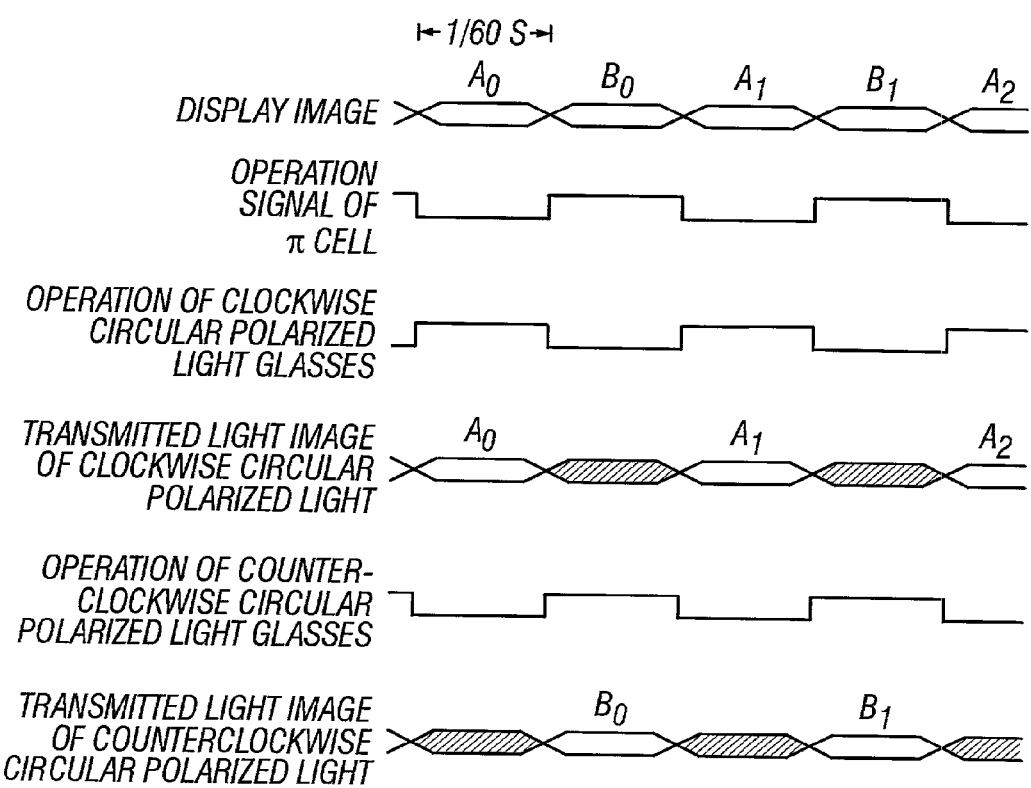
FIG. 4 is a diagram showing an example of an operating timing chart when the structure shown in FIG. 3 is operated.

FIG. 3 shows an example of a specified structure of a display unit in accordance with this embodiment. In the structure shown in FIG. 3, an image formed in a CRT 21 is displayed with time-division as shown in FIG. 4. At a timing shown in FIG. 4, one-frame display is alternately conducted during ⅟₆₀ seconds. It should be noted that the length of one frame is preferably set to ⅟₆₀ sec or less to maintain the high image quality.

A light emitted from the CRT 21 is converted into a straight polarized light through a polarizing plate 22. The polarizing state of the straight polarized light is changed in a π cell 23.

The π cell 23 is operated by a controller 27 in synchronism with the display timing on the CRT 21 while controlling an element driver 28. The π cell 23 is driven by the element driver 28 and directly transmits a straight polarized light which is incident when the output of the driver 28 is in an on-state. Also, the π cell 23 allows the polarizing state of the transmitted light to rotate by 90° when the output of the driver 28 is in an off-state. The action of rotating the polarization state by 90° can be obtained by using the optical rotation property of liquid crystal.

The transmission light which is transmitted by the π cell 23 has the straight polarization states which are different from each other by 90° in accordance with the on-state or the off-state of the π cell 23. Then, the light which has been transmitted by the π cell 23 is allowed to be transmitted by a ¼-wavelength plate 24, thereby being capable of separating the light into a light having a clockwise circular polarization state and a light having a counterclockwise circular polarization state, respectively.

In this embodiment, the transmitted light of the clockwise circular polarization is produced when the π cell 23 is in the off-state, and the transmitted light of the counterclockwise circular polarization is produced when the π cell 23 is in the on-state. In other words, a light which is transmitted by the ¼-wavelength plate 24 is converted into the clockwise circular polarized light and the counterclockwise circular polarized light in accordance with the on/off operation of the π cell.

The clockwise circular polarized light and the counterclockwise circular polarized light are alternately imaged every ⅟₆₀ sec by time-division display. In the structure shown in FIG. 3, the clockwise circular polarized light and the counterclockwise circular polarized light are alternately imaged on the ¼-wavelength plate 24.

When the projected images are viewed by the clockwise circular polarizing glasses 25 and the counterclockwise circular polarizing glasses 26, the clockwise circular polarized light can be selectively viewed by the clockwise circular polarizing glasses 25. Also, the counterclockwise circular polarized light can be selectively viewed by the counterclockwise circular polarizing glasses 26.

In other words, as shown in FIG. 4, a viewer who puts on the clockwise circular polarizing glasses can view only the frames of $A_0$, $A_1$, $A_2$, . . . , so as to selectively view the image A. Also, a viewer who puts on the counterclockwise circular polarizing glasses can view only the frames of $B_0$, $B_1$, $B_2$, . . . , so as to selectively view the image B.

In the structure shown in this embodiment, since there is required no use of glasses having a specific element as shown in the structure of FIG. 1, a load applied to the viewer who views the image can be lowered. Also, the degree of freedom of the circumstances where the image is viewed can be enhanced.

(Third Embodiment)

A third embodiment is characterized in that two images different in polarizing states are synthesized and projected, and the projected image is viewed using the glasses that selectively transmit the respective polarized lights, whereby those two images are selectively viewed by the viewers who put on the respective glasses.

Figure 5:
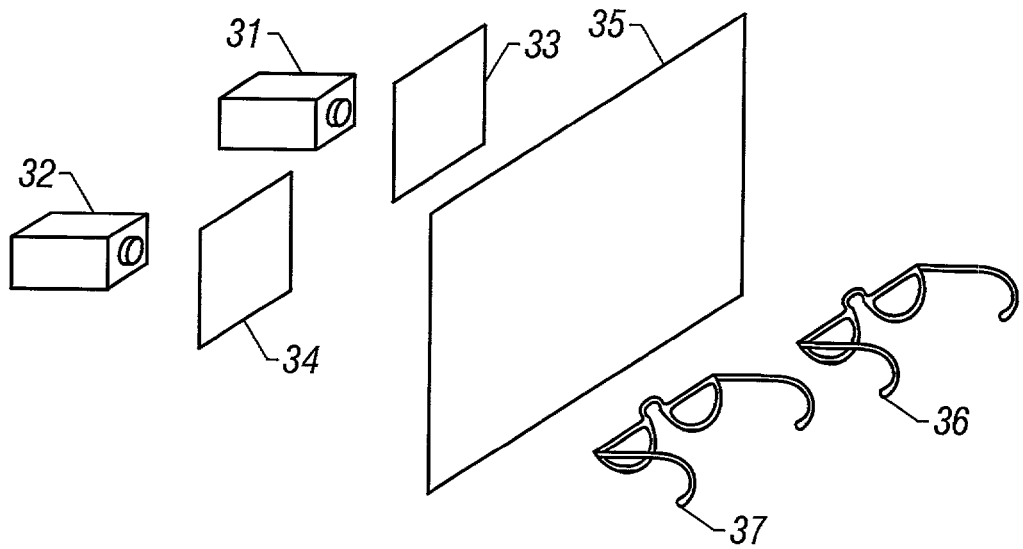
FIG. 5 is a diagram showing the outline of a display unit, through which being capable of viewing different images by a plurality of viewers simultaneously, using a difference of polarizing states.

FIG. 5 shows an outline of the structure of a display unit in accordance with this embodiment. What is shown in FIG. 5 is a structure in which the respective different images are superimposed and projected on a screen 35 by two liquid-crystal projectors 31 and 32, and those projected images are viewed through polarizing glasses 36 and 37.

The image projected from the liquid-crystal projector 31 is projected on the screen 35 through a polarizing plate 33. The polarizing plate 33 includes a function of transmitting the straight polarized light having a vertical polarizing direction. Hence, the image projected from the projector 31 onto the screen 35 has the vertical straight polarization.

On the other hand, the image projected from the liquid-crystal projector 32 is projected on the screen 35 through a polarizing plate 34. The polarizing plate 34 includes a function of transmitting the straight polarized light having a horizontal polarizing direction. Hence, the image projected from the projector 32 onto the screen 35 has the horizontal straight polarization.

Also, the polarizing glasses 36 have a function of transmitting the vertical straight polarized light, and the polarizing glasses 37 have a function of transmitting the horizontal straight polarized light.

Hence, the image projected from the projector 31 to the screen 35 can be selectively viewed through the glasses 36. In other words, the image from the projector 31 can be viewed without viewing the image from the projector 32.

Also, the image projected from the projector 32 to the screen 35 can be selectively viewed through the glasses 37. In other words, the image from the projector 32 can be viewed without viewing the image from the projector 31.

In other words, since the glasses 36 have the function of transmitting the vertical straight polarized light but not transmitting the horizontal straight polarized light, the image projected from the projector 31 can be viewed but no image projected from the projector 32 can be viewed.

On the other hand, since the glasses 37 have the function of transmitting the horizontal straight polarized light but not transmitting the vertical straight polarized light, the image projected from the projector 32 can be viewed but no image projected from the projector 31 can be viewed.

In this way, the viewer who puts on the glasses 36 and the viewer who puts on the glasses 37 can view the respective different images.

Figure 6:
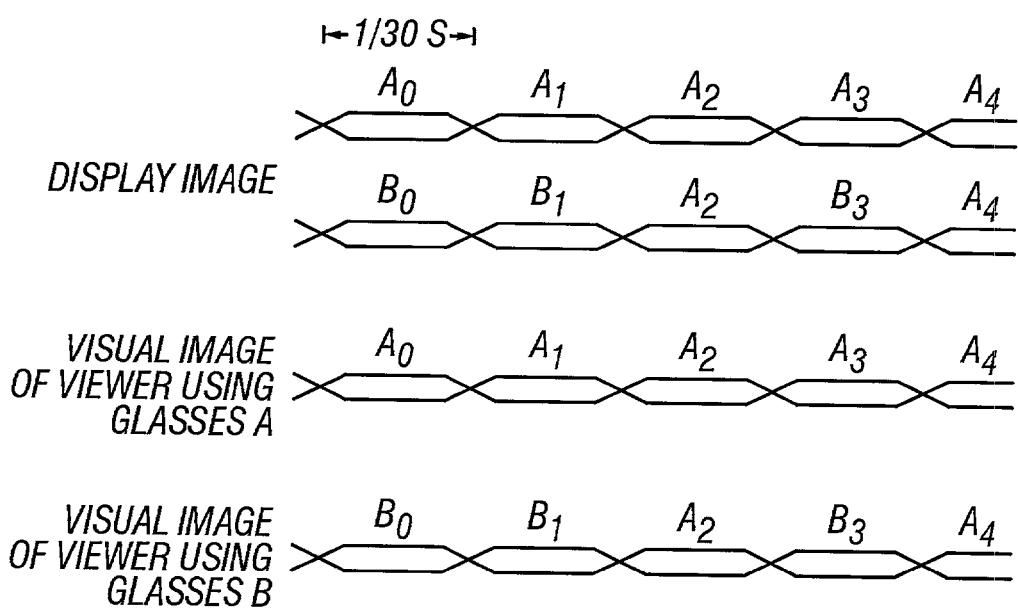
FIG. 6 is a diagram showing an example of an operating timing chart when the structure shown in FIG. 5 is operated.

FIG. 6 shows a timing chart for operating the structure of a display unit shown in FIG. 5. In FIG. 6, one frame of the image projected from the projector 31 is indicated by $A_i$ (i is a natural number including 0). Also, one frame of the image projected from the projector 32 is indicated by $A_j$ (j is a natural number including 0).

In order to maintain the normal image quality, the length of one frame is preferably set to 1/30 sec or shorter.

The frames of two images are superimposed on each other simultaneously and projected. Then, those two images projected from two projectors can be observed as individual ones by the viewer wearing the A-glasses and the viewer wearing the B-glasses.

Figure 7:
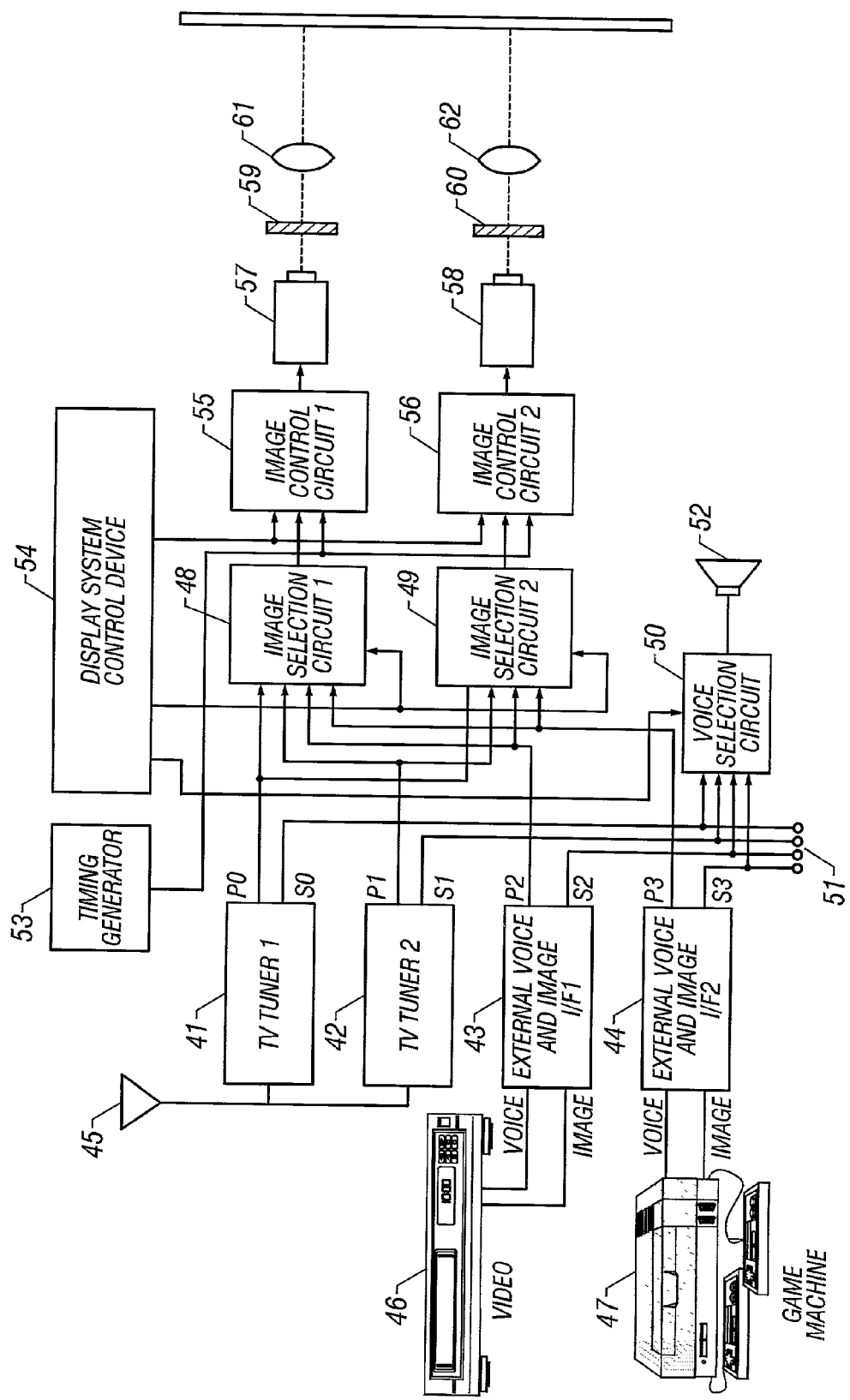
FIG. 7 is a block diagram showing an electric structure of the structure shown in FIG. 5.

FIG. 7 shows a block diagram showing the structure shown in FIG. 5. As shown in FIG. 5, the structure shown in this embodiment can use no specific image but the normal TV image or video image.

(Fourth Embodiment)

Figure 8A:
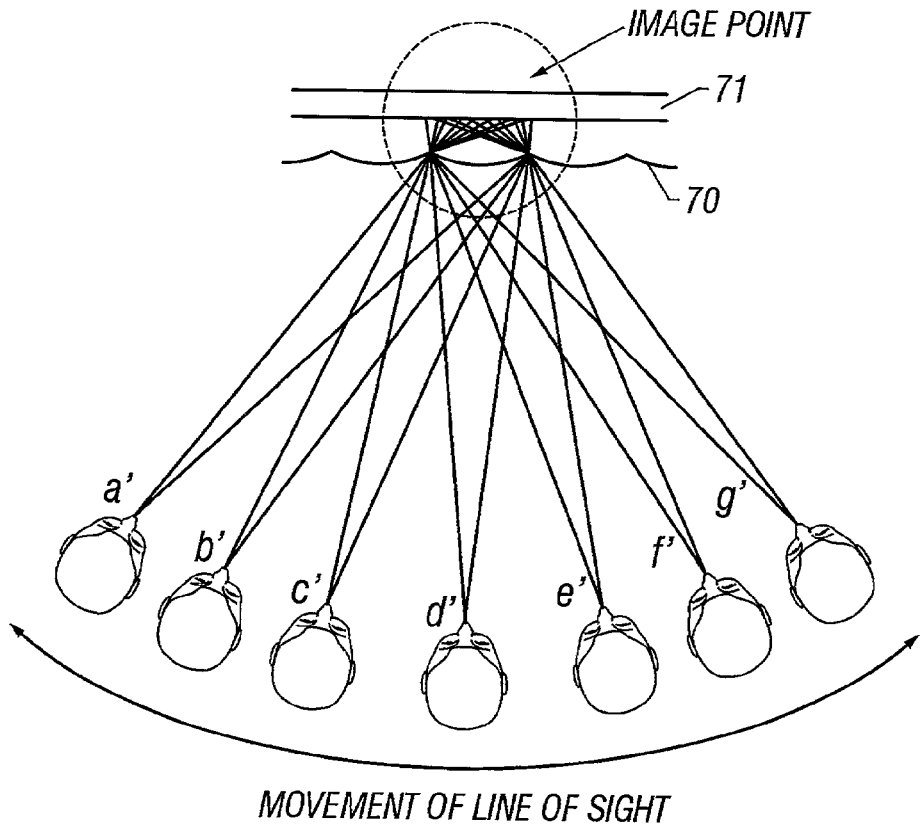
FIGS. 8A and 8B are diagram showing the principle when different images are viewed by a plurality of viewers simultaneously, using a lenticular lens.
Figure 8B:
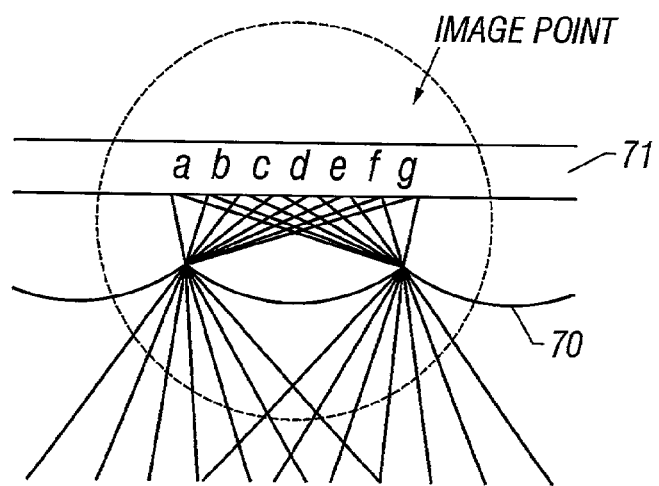

A fourth embodiment relates to a structure in which a plurality of viewers different images simultaneously using a lenticular lens 70 (lenticular screen). FIGS. 8A and 8B show diagrams of the principle of a display unit in accordance with this embodiment. Using the lenticular lens, different images can be viewed by making the visual points varied.

For example, the image focussed on a point a of a screen 71 can be recognized from a visual point a', however, other images cannot be recognized (It is needless to say that other images are viewed a little since cross-talk exists.).

In the structure shown in the figure, for example, display data of A is given to the display regions a and b of a display LCD 71, display data of B is given to the display regions c and d, display data of C is given to the display regions e and f, and display data of D is given to the display regions g and h, thereby being capable of viewing different four images at different visual points. It should be noted that symbols a, b and so on denote specific regions or pixels.

Also, the display data of A is given to a, b, c and d, and the display data of B is given to d, e, f and g, thereby being capable of viewing different two images at different visual points.

The method using the lenticular lens 70 in accordance with this embodiment is to recognize different images depending on visual points. Hence, this leads to such a problem that other images are allowed to be viewed with the visual point being moved. Also, for example, there arises such a problem that it is difficult to completely separate the images displayed on the points a and b from each other.

In order to release this problem, identical image data is given to image points (one point to which an attention is paid) close to each other so that different images are prevented from being viewed even though there exists a slight replacement of the visual points, and also so that an identical image can be viewed over the wide extent. It should be noted that if identical image data is given to a large number of pixels, then the resolution of images are degraded, which requires attention.

Specifically, in a state shown in FIGS. 8A and 8B, the display data of an image A is given to a to c of a display unit 71, and the display data of an image B is given to e to g of a display unit 71. With this operation, the display data of the image A displayed on a display region 72 can be selectively viewed on the right side toward the screen. In other words, the display data of the image A can be selectively viewed without viewing the display data of the image B.

On the other hand, the display data of the image B displayed on a display region 72 can be selectively viewed on the left side toward the screen 70. In other words, the display data of the image B can be selectively viewed without viewing the display data of the image A.

Then, even though the visual point is replaced right and left, the above-described viewing can be maintained. In other words, its selective viewing can be maintained.

(Fifth Embodiment)

The method described with reference to the fourth embodiment is that the screen is viewed from the different visual points, thereby being capable of viewing different images, and using this phenomenon, different images can be simultaneously viewed by a plurality of viewers.

In this example, it is assumed that the display data of an image A is given to a to c, and the display data of an image B is given to e to g. In this case, the respective different images must be viewed at the visual points d' and e'. However, in fact, those images are superimposed on each other or made unclear at the visual points d' and e'.

Specifically, the images A and B may be viewed simultaneously, or the images A and B may be viewed or not viewed simultaneously or one by one with the slight movement of the visual point. In other words, cross-talk of the images A and B occurs.

In order to suppress the above phenomenon, this embodiment provides the structure as stated blow. In other words, in the state shown in FIGS. 8A and 8B, black, white or an appropriate background color is given to a point d between the image points c and e as image data, thereby providing a region (non-display region) where no image is displayed. With this structure, the cross-talk of the images A and B can be reduced.

A specific example of a method of suppressing the cross-talk of the different images with the provision of the region (non-display region) 3 where no image is displayed is shown in FIGS. 9A to 9D. What is shown in FIGS. 9A to 9D is an example that realizes the above structure using an LCD (liquid-crystal electric field optical device). In FIGS. 9A to 9D, reference numeral 80 denotes a lenticular, and 81 is an image LCD.

If display is monochrome, the non-display region is white or black. If display is color, white, black or other appropriate background color can be selected.

In FIGS. 9A to 9D, what is indicated by oblique lines is a non-display region 82 which is a region where black, white or an appropriate background color is displayed.

Figure 9A:
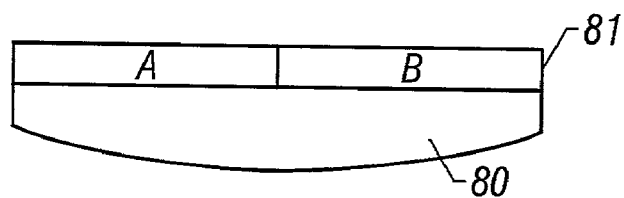
FIGS. 9A to 9D show examples in the case of displaying a plurality of images, using a lenticular lens.

What is shown in FIG. 9A is a comparative example, that is, a structure where the cross-talk of the images A and B occurs. It should be noted that the display region 83 indicated by A, B or the like may be one pixel or a region made up of a plurality of pixels.

Figure 9B:
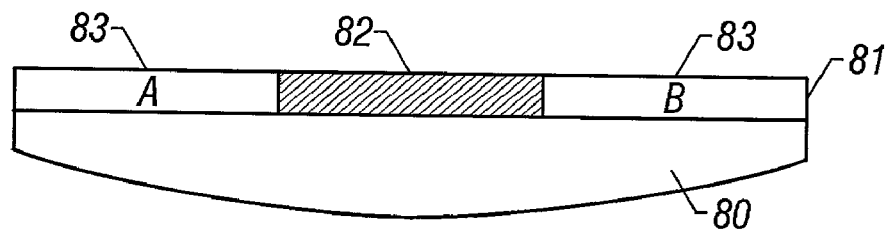

FIG. 9B shows a structure in which an non-display region 82 indicated by oblique lines is intentionally formed on a predetermined region of LCD, to thereby suppress the cross-talk of the pixel data of A and B displayed on the display region 83.

Figure 9C:
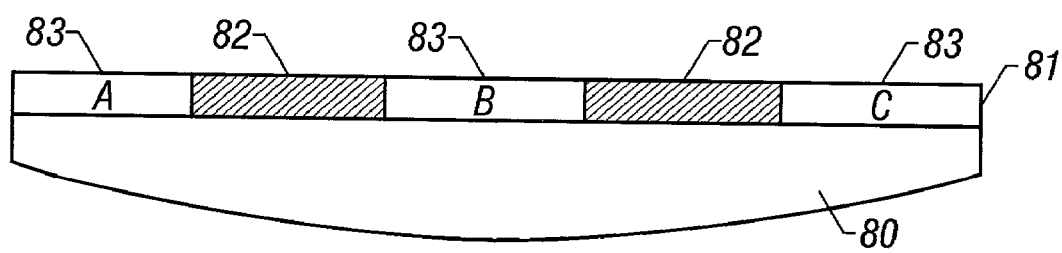

FIG. 9C shows a further development of the structure shown in FIG. 9B, that is, a structure in which the cross-talk of the pixel data indicated by. A to C is suppressed. Similarly, in this case, the non-display regions 72 are formed between the respective display regions 71 where the pixel data is displayed, thereby being capable of reducing the cross-talk between the respective data.

The methods shown in FIGS. 9B and 9C are characterized in that since LCD (liquid-crystal display unit) is used, the non-display region 72 can be formed arbitrarily. In other words, since the non-display regions 72 can be formed with arbitrary extent at arbitrary locations, for example, a case of displaying image data A and B and a case of displaying image data A to C can be appropriately selected.

Also, the degree of cross-talk can be changed. For example, with a change of the area of the non-display region 72, the image data A and B are mixed, and the degree of display of those image data (they are viewed as if they are mixed depending on the visual points) can be controlled.

Further, the non-display region 82 is appropriately displayed in such a manner that the image A, the image into which the images A and B are superimposed on each other, the image B can be viewed independently in accordance with view point. In other words, although the number of image data is only two, the number of the images which can be viewed independently can be set to 3. Then, positions and extent where those images can be viewed can be set (adjusted) by using LCD.

Furthermore, in the structure shown in FIGS. 9B and 9C, physical optical shielding means such as BM (black matrix) may be used to form the non-display region 82. It should be noted that, in this case, the position at which the non-display region is formed is inconveniently so fixed as not to be movable.

Figure 9D:
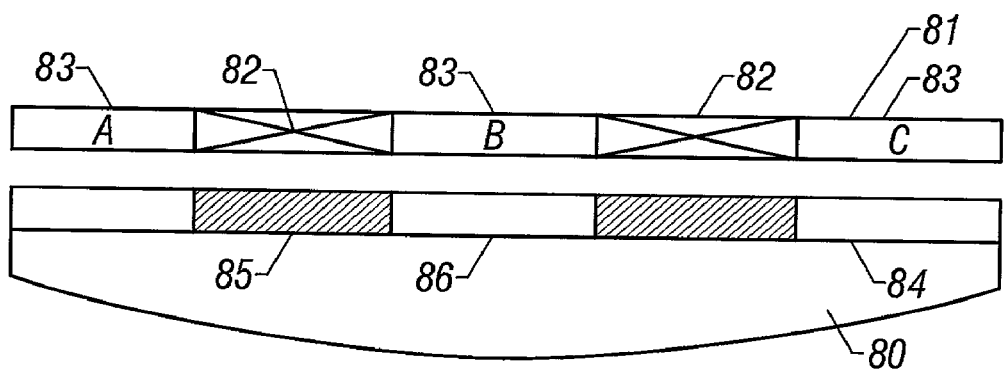

What is shown in FIG. 9D is an example in which, in addition to the image formation LCD 81, an optical shutter for selecting the non-display region 82 is made up of a shutter LCD 84. Non-transmission regions 85 and transmission regions 86 are alternately formed by the open/shut operation of the shutter LCD 84, thereby being capable of deciding the non-display regions 82 and the display regions 83. With such a structure, the non-display regions can be formed of only the shutter LCDs, or the non-display regions can be formed with the combination of the shutter LCD 84 and the image LCD 81, with the result that the degree of freedom of operation can be increased.

The display method of this embodiment may be a method of directly forming an image using LCD as described above. Other display means may be a projection-type liquid-crystal display unit. Also, using a plurality of projection-type display units, images from the respective display units may be superimposed on each other.

With the operation shown in FIGS. 9B to 9D, the cross-talk of the different images which are displayed simultaneously can be reduced.

Conversely, the cross-talk of the different images is controlled so that two images which are superimposed on each other can be displayed intentionally or with the control of their position, depending on the visual points.

(Sixth Embodiment)

A sixth embodiment relates to an example in which, using a parallax barrier, a plurality of different images are viewed on a display plane when viewed from different visual points.

This system is concerned with a structure in which slit-like aperture grills 90 (parallax barrier) are formed on a display plane of the display panel 91 at given intervals as shown in FIG. 10, and the images different depending on the visual positions can be observed by viewing the display plane of the panel 91 through the slit.

For example, in the structure shown in FIG. 10, the display data of the image A is given to a and b, and the display data of the image B is given to d and e. With this conditions, the image A can be selectively viewed at the visual points of a' and b', and the image B can be selectively viewed at the visual points of d' and e'.

In the case of applying the structure of this embodiment, the cross-talk of the different images may occur depending on the visual points. Therefore, such a device as described in the fifth embodiment is effective in the reduction of cross-talk.

Also, it is useful to use an optical shutter employing liquid crystal as the parallax barrier 90. In this case, since the width, the position, and the interval of the slits can be appropriately set, the number of images to be displayed and the position of the visual point are readily adjusted. In particular, the control of the position of the visual point is useful in its application.

(Seventh Embodiment)

A seventh embodiment relates to a play device using the structure (structure shown in FIGS. 8A and 8B) described in the fourth embodiment. The play device shown in FIGS. 8A and 8B enables viewing different images depending on positions (visual points) at which a screen (display plane of an image) is viewed.

In view of this, this embodiment shows an example in which the present invention described in this specification is applied to a competition-type grapple game for two players. FIG. 11 shows the positional relationship between a display plane and two players.

Two players 101 and 102 view a screen 103, on which an image projected from a liquid-crystal projector 104 is displayed, from different angles simultaneously. The screen 103 includes a lenticular lens (lenticular screen) as described in the fourth embodiment (refer to FIG. 8A and 8B).

Then, it is structured so that the players 101 and 102 can view the different images. The area of the screen 103 is preferably as large as possible to enhance the play effect. Also, it is important to decide the display way and the positional relation between two players so that the cross-talk of the image from the visual point of the player 101 and the image from the visual point of the player 102 is prevented from occurring.

FIG. 12 shows the structure in which the same effect as that in FIG. 11 can be obtained by the principle different from the structure shown in FIG. 11. What is shown in FIG. 12 is that two images having the respective different polarizing states are superimposedly projected on a screen 115, and those images are separated using filters 113 and 114 that transmit the respective polarizing states, whereby the players 111 and 112 view different images.

The structure shown in FIG. 12 is described in more detail below. In the structure shown in FIG. 12, an image which is allowed to be viewed by the player 111 is formed by a liquid-crystal projector 118, and an image which is allowed to be viewed by the player 112 is formed by a liquid-crystal projector 119. Then, those images are allowed to be transmitted by a polarizing plate 116 that transmits a straight polarized light vertically and a polarizing plate 117 that transmits a straight polarized light horizontally, thereby being superimposedly projected on the screen 115. It should be noted that a screen for the normal projection-type display unit may be used as the screen 115.

The player 111 views the images superimposedly projected on the screen 115 through the polarizing plate 113 that transmits a straightly polarized light vertically. On the other hand, the player 112 views the images superimposedly projected on the screen 115 through the polarizing plate 114 that transmits a straightly polarized light horizontally.

As a result, the player 111 selectively views only the image projected from the liquid-crystal projector 118. On the other hand, the player 112 selectively views only the image projected from the liquid-crystal projector 119. In this way, two players can view the respective different images while viewing the identical screen.

Figure 13A:
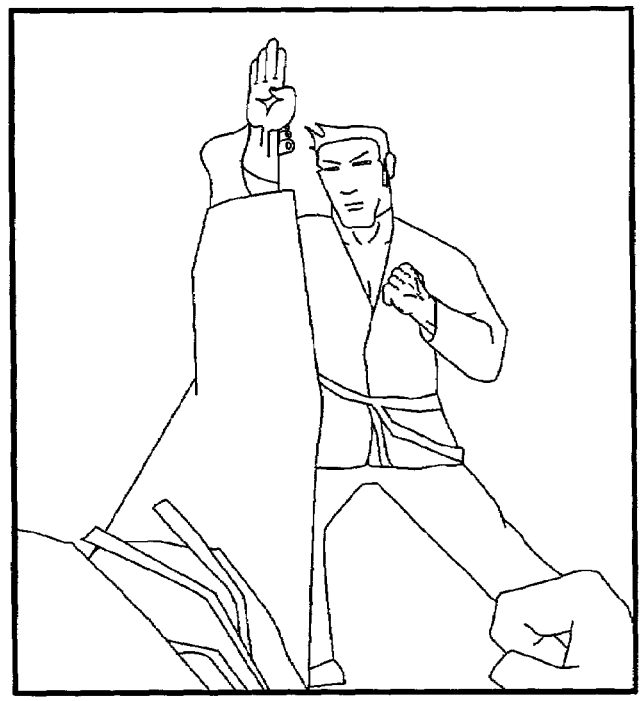
FIGS. 13A and 13B show an example of images displayed on a screen of a play device using the device shown in FIG. 12.
Figure 13B:

FIG. 13 shows an example of images viewed by the respective players in the case of using the play device shown in FIGS. 11 and 12. What is shown in FIG. 13 is the play contents of the grapple game. As shown in FIG. 13, the respective players can view a character which is manipulated by him and a character which is manipulated by a counterpart.

This structure is remarkably characterized in that the competing players can view the respective different images simultaneously.

In the case of the structure shown in FIGS. 11 and 12, since only one display screen is provided, the structure can be simplified. Also, the size of a screen can be increased more in comparison with a case in which different screens are disposed.

This embodiment shows an example of a competition-type grapple game for two players. However, this structure can be applied for education or leaning. Also, this structure can be used for a case in which different programs can be viewed with one screen. Further, this structure can be applied to a case in which different displays are displayed on an identical screen in a public service or the like.

(Eighth Embodiment)

An eighth embodiment shows a device for forming an image which can be used in the present invention and the embodiments described in this specification. The device for forming an image is generally CRT or a liquid-crystal display unit (LCD). In particular, it is guessed that LCD is used more in the future since it can be made still thin and is small and light in weight.

The LCD is useful in having the liquid-crystal display unit of the peripheral drive circuit integrated type in which an active matrix region and a peripheral drive circuit region are integrated on an identical glass substrate or a quartz substrate small-sized, weight-reduced and thinned, as well as the manufacturing costs reduced.

In this example, it is assumed that the above structure is applied to a projection-type liquid-crystal display unit that enables color display. In the projection-type liquid-crystal display unit that enables color display, in order to obtain a bright screen, active matrix regions are provided for the respective R, G and B. In this case, it is required that the active matrix regions for R, G and B and the peripheral drive circuits for driving the active matrix regions are integrated on an identical glass substrate or quartz substrate.

In general, a horizontal scanning drive circuit and a vertical scanning drive circuit as the above drive circuit are required for one active matrix region. Hence, in the case of applying the above-mentioned integrated structure, the drive circuits must be formed in six regions.

Since the peripheral drive circuit has a high integrated degree, the manufacture of a large number of peripheral drive circuits on an identical substrate leads to the lowering of a yield as much.

In view of this, the active matrix type liquid-crystal panel described in this embodiment is structured in such a manner that in the structure in which a plurality of active matrix regions are disposed on an identical substrate, a horizontal scanning control circuit and/or a vertical scanning control circuit are commonly disposed for the plural active matrix regions.

Figure 14:
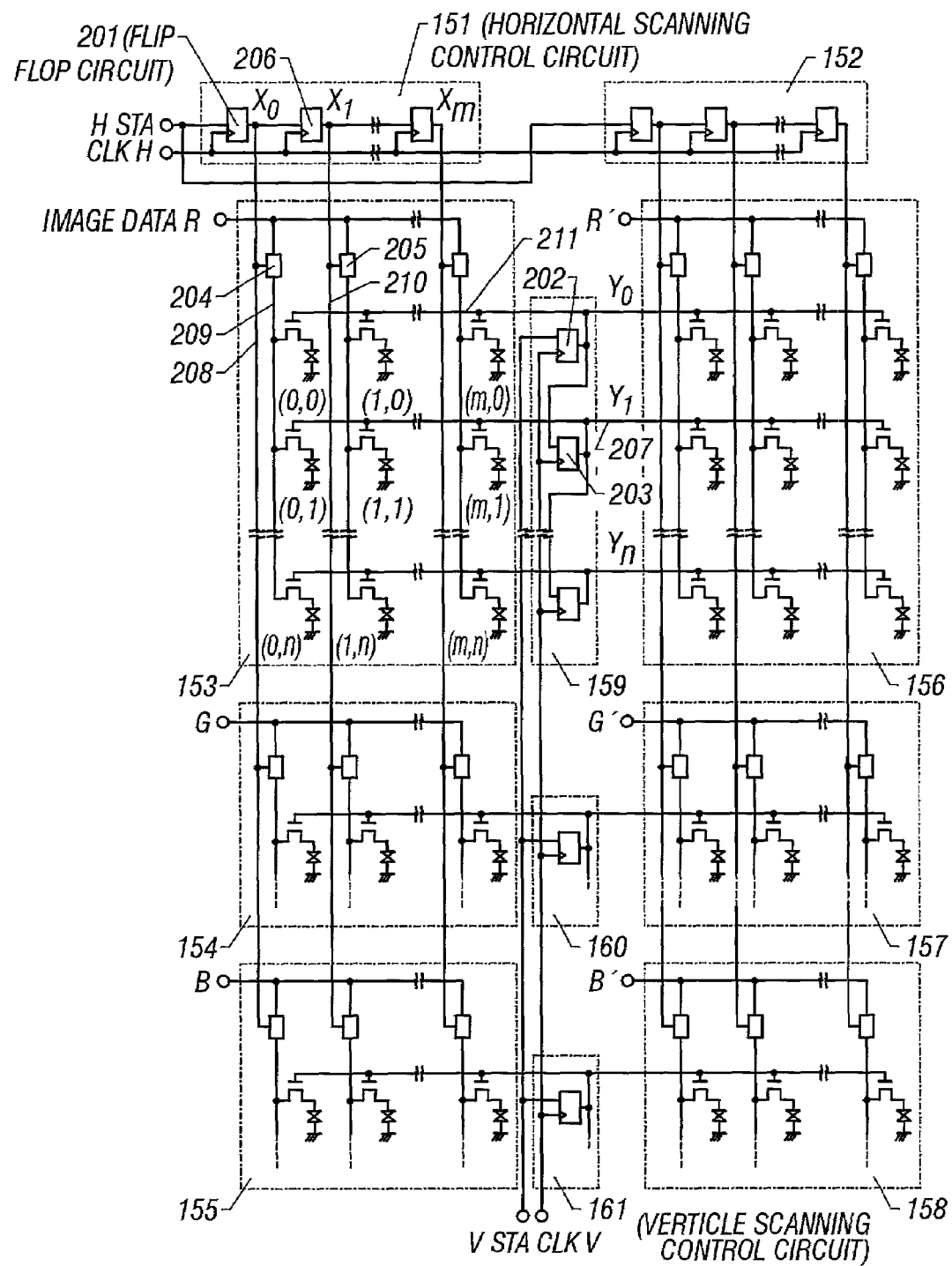
FIG. 14 shows the structure of the outline of an integrated active matrix type liquid-crystal panel for forming an image.

FIG. 14 shows the structural outline of an integrated active matrix type liquid-crystal panel in accordance with this embodiment. The structure shown in FIG. 14 is that active matrix regions where images of M×N are formed and a region having peripheral circuits of M+N are formed on a substrate, assuming that M and N are natural numbers of 2 or more, the M– peripheral circuits conduct horizontal scanning control of the N– active matrix regions simultaneously, and the N– peripheral circuits conduct vertical scanning control of the M– active matrix regions simultaneously.

FIG. 14 shows a case of M=2 and N=3 in the above structure. FIG. 14 shows (M=2)×(N=3) active matrix regions 153, 154, 155, 156, 157 and 158.

Also, as the peripheral circuit regions for driving those active matrix circuits, there are arranged (2+3) peripheral circuits 151, 152, 159, 160 and 161. Among those peripheral circuits, the peripheral circuits 151 and 152 are horizontal scanning control circuits. Also, the peripheral circuits 159, 160 and 161 are vertical scanning control circuits.

In the structure shown in FIG. 14, the horizontal scanning control circuits 151 and 152 simultaneously conduct the horizontal scanning control of the active matrix circuits 153, 154 and 155, and the active matrix circuits 156, 157 and 158, respectively.

In other words, the peripheral circuit 151 simultaneously conducts the horizontal scanning control of the active matrix regions 153, 154 and 155. Also, the peripheral circuit 152 simultaneously conducts the horizontal scanning control of the active matrix regions 156, 157 and 158.

Further, the peripheral circuits 159, 160 and 161 simultaneously conduct the vertical scanning control of the active matrix regions 153, 156, the active matrix regions 154, 157 and the active matrix regions 155, 158, respectively.

In other words, the peripheral circuit 159 simultaneously conducts the vertical scanning control of the active matrix regions 153 and 156. Also, the peripheral circuit 160 simultaneously conducts the vertical scanning control of the active matrix regions 154 and 157. Further, the peripheral circuit 161 simultaneously conducts the vertical scanning control of the active matrix regions 155 and 158.

In the structure shown in FIG. 14, N=3 to obtain the color image of R, G and B. However, the structure may be M=N=2 (that is, 2×2). Also, it may be M=2 and N=1. Further, it may be M=1 nd N=2. In this case, color images may be obtained in the respective matrix regions using the color filters of R, G and B, or monochrome images may be obtained.

As shown in FIG. 14, the (M×N) active matrix regions are generally arranged in the form of a matrix.

Furthermore, pixels are arranged in the form of a matrix in the active matrix regions, at least one thin-film transistor is arranged on the pixels, a signal applied to the source of thin-film transistor is controlled by horizontal scanning control which is conducted by the respective M– peripheral circuits, and a signal applied to the gate of thin-film transistor is controlled by vertical scanning control which is conducted by the respective N– peripheral circuits.

The pixels in the above structure may be, for example, regions indicated by addresses (0,0), (1,0) . . . (m,0) shown in FIG. 14. In the structure shown in FIG. 14, one thin-film transistor is disposed in each of the pixels.

It should be noted that the number of the thin-film transistors disposed in each of the pixels is not limited to only 1. The method of arranging the thin-film transistors may be that a plurality of thin-film transistors are connected in series, or the thin-film transistors are arranged in combination with MOS capacity. Also, it is not only the combination of the identical channel types but the combination of different channel types.

It should be noted that in the structure shown in FIG. 14, since it is necessary that the liquid-crystal panel transmits a light, the substrate need be made of translucent material. Specifically, it is necessary to use a glass substrate or a quartz substrate.

An example of operation of the structure shown in FIG. 14 will be described briefly. In the structure shown in FIG. 14, the operation of the vertical scanning control circuits which are indicated by reference numerals 159 and 160 is basically controlled by the operating clock of the vertical scanning control circuit which is indicated by CLKV. Also, the operation of the horizontal scanning control circuits which are indicated by reference numerals 151 and 152 is basically controlled by the operating clock of the horizontal scanning control circuit which is indicated by CLKH.

Hereinafter, a description will be given of a method of displaying an image in an active matrix region 153 for the purpose of simplifying description. It should be noted that the operation of other active matrix regions complies with the active matrix region 153.

First, when the rising pulse of CLKV (the operating clock of the vertical scanning control circuit) is inputted to a flip-flop circuit 202 of a vertical scanning control circuit 159, VSTA (vertical scanning timing enable signal) is generated. In this situation, the output signal of the flip flop circuit 202 become H level (high in logic level). Also, the output level of another flip flop circuit of the vertical scanning control circuit 159 remains L.

As a result, a gate signal line 211 indicated by a line $Y_0$ becomes H level. Then, all the thin-film transistors at addresses (0,0), (1,0) . . . (m,0) become on-operation.

In this state, HSTA (horizontal scanning timing enable signal) is generated by CLKH (the operating clock of the horizontal scanning control circuit) in the flip-flop circuit 201 of the horizontal scanning control circuit 151, and then a signal level at point $X_0$ becomes H. Tn this state, points subsequent to $X_1$ are L (low in logic level).

As a result, a signal of H is inputted to a sampling hold circuit 204 through an image sampling signal line 208, and an image data signal of R is taken in the sampling hold circuit 204.

Then, image data flows in an image signal line 209. In other words, a signal of image data is applied to the source of the thin-film transistors at the addresses (0,0), (0,1), (0,2), . . . (0,n).

In this state, all the thin-film transistors at the addresses (0,0), (1,0) . . . (m,0) are in on-state, and the image data signal is applied to the source of the thin-film transistors at the addresses (0,0), (0,1), (0,2), . . . (0,n). Hence, image data is written in the pixel at address (0,0).

Thereafter, the output signal of the flip flop circuit 201 becomes L level by the rising edge of the pulse of subsequent CLKH. In other words, the point $X_0$ becomes L level. On the other hand, in the flip flop circuit 206, the rising edge of the CLKH pulse is inputted, thereby changing its output signal to H level. In other words, the point $X_1$ becomes H level.

As a result, information is written at address (1,0). In this way, the output signals of the flip flop circuit $X_m$ are sequentially shifted to H level in accordance with the operating clock of CLKH. Then, image information is sequentially written at address (m,0).

After the completion of writing information on line $Y_0$, the output level of the flip flop circuit 202 becomes L and the output level of the flip flop circuit 203 becomes H in accordance with the rising edge of a CLKV signal. As a result, the signal level at line $Y_1$ becomes H.

Then, image data information is sequentially written at the addresses (0,1), (1,1) . . . (m,1) on line $Y_1$. In this way, at the time when the writing of information up to address (n, m) is completed, one frame is completed.

The above operation is conducted at the same timing even in other active matrix regions other than the region 153.

Using the integrated liquid-crystal panel shown in FIG. 14, two color images which consist of R, G and B can be obtained simultaneously. It is needless to say that the color images may have the respective different contents.

This embodiment shows the structure in which 6 active matrix regions are integrated. However, it is possible to further increase the number of the integrated active matrix regions. For example, it may be so structured that RGB, R'G'B', R", G", B", and nine active matrix regions are integrated.

In this case, in the structure shown in FIG. 14, only one additional horizontal scanning control circuit may be provided. In this case, three pairs of color images can be obtained.

In this way, the integrated active matrix type liquid-crystal panel a basic structure of which is shown in FIG. 14 is characterized in that even though the integrated active matrix regions are increased in number, the peripheral drive circuits may not be increased so much.

Specifically, assuming that the number of the integrated active matrix regions is M×N, the required number of peripheral drive circuits may be (M+N). This is very useful in the case of enhancing the integrated degree.

(Ninth Embodiment)

Figure 15A:
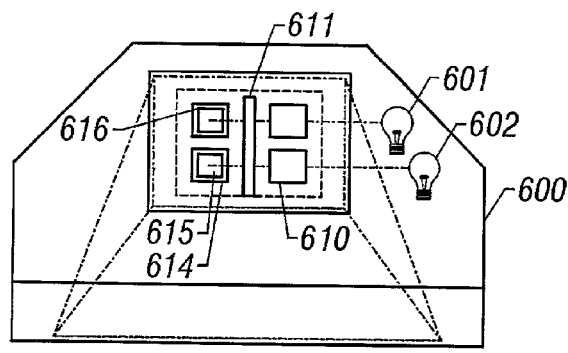
FIG. 15A and 15C are diagram showing the structure of the outline of a projection type display unit using the liquid-crystal panel shown in FIG. 14.
Figure 15B:
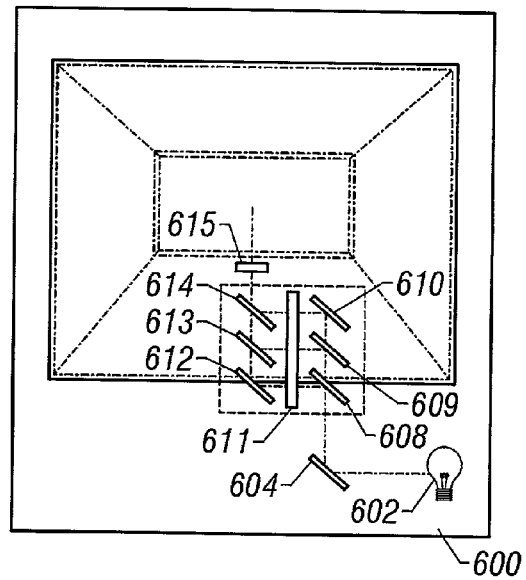
Figure 15C:
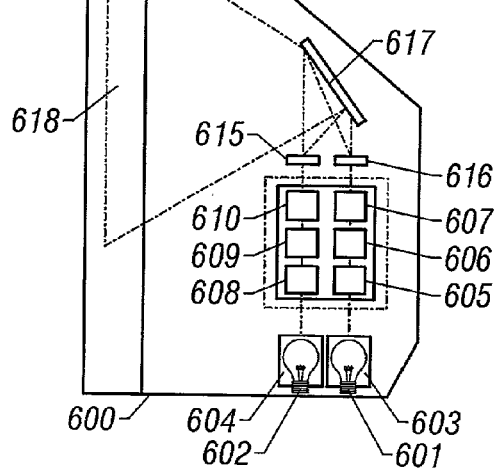

A ninth embodiment shows a projection-type liquid-crystal display unit using a liquid-crystal panel in which six active matrix regions are integrated as shown in FIG. 14. FIGS. 15A to 15C shows an outline of the projection-type liquid-crystal display unit in accordance with this embodiment.

The display unit shown in FIGS. 15A to 15C can be used for the structures of other embodiments described in this specification.

In the structure shown in FIGS. 15A to 15C, a light from a first light source 602 is reflected by a mirror 604, and further spectral into lights of wavelength regions corresponding to G, B and R by dichroic mirrors 608, 609 and 610. Then, the respective lights are made incident to the integrated liquid-crystal panel 611 shown in FIG. 14.

The optically modulated light in the respective pixel regions corresponding to RGB in the liquid-crystal panel 611 has an image of G reflected by a mirror 612, an image of B reflected by a half-mirror (semi-transparent mirror) 613, and an image of R reflected by a half-mirror (semi-transparent mirror) 614.

The color images thus synthesized is reflected by a mirror 617 through an optical system 615 and projected on a screen (a projection plane) 618. A lens necessary for enlargement projection is disposed in the optical system 615. Also, an optical shutter that selectively conducts the transmission/non-transmission of a light as occasion demands and means for giving a predetermined polarizing state are disposed in the optical system 615.

On the other hand, a light from the light source 601 is reflected by a mirror 603, and further made spectral into lights corresponding to G', B' and R' by dichroic mirrors 605, 606 and 607, respectively. Then, the respective lights are optically modulated into images corresponding to G', B' and R' in the liquid-crystal panel.

Thereafter, the lights (6 rays in total) corresponding to the optically modulated R', G' and B' are synthesized by a mirror group not shown, and then projected through the optical system 615 and a mirror 616. The projected image is reflected by the mirror 617 so as to be projected on the screen 618.

The integrated liquid-crystal panel 611 (refer to FIG. 14) used in the structure shown in FIGS. 15A to 15C can form two different color images. Hence, using this fact, two different color images can be projected on the screen 618 simultaneously. Also, with the setting of the display timing, two different color images can be displayed with time-division.

The display unit shown in FIG. 15 can be used in the image forming means with the structures shown in FIGS. 1 and 3, FIGS. 5, 8A, 8B and 10, and FIGS. 11 and 12.

For example, in the case of conducting time-division display as shown in FIGS. 1 and 3, using the integrated liquid-crystal panel shown in FIG. 14, frames, for example, indicated by $A_0, A_1, A_2, \ldots$ in FIG. 2 are formed in the active matrix regions 153 to 155 shown in FIG. 14. Also, frames, for example, indicated by $B_0, B_1, B_2, \ldots$ in FIG. 2 are formed in the active matrix regions 156 to 158 shown in FIG. 14.

As a result, the images A and B are displayed with time-division. In the case of directly viewing the images displayed with time-division, the images A and B which are superimposed on each other are viewed. To eliminate this problem, in the structure shown in FIG. 1 which was described in the first embodiment, glasses 13 and 14 having liquid-crystal shutters that select transmission/non-transmission in synchronism with a display timing are used in such a manner that the images A and B are viewed as if they are separated from each other by the viewers that put on the respective glasses.

In order to conduct display with time-division as described above, frames are alternately formed on the active matrix regions 153 to 155 and the active matrix regions 156 to 158, thereby being capable of lowering the operating frequency of the respective horizontal scanning control circuits, thus providing a structure which is useful in enhancing the reliability of the circuit. It should be noted that, in the case of conducting the above time-division display with the structure shown in FIG. 14, it is necessary that the kind of the CLKH and HSTA signals and their inputting way are made different from those in the case shown in FIG. 14. In other words, a device is required such that the formation of one frame conducted by the horizontal scanning control circuit 101 and the formation of one frame conducted by the horizontal scanning control circuit 102 are alternately conducted.

Also, in the case of using the display unit shown in FIG. 15 to the structure in which two images shown in FIG. 5 are synthesized and projected, one image (color image) is formed in the active matrix regions 153 to 155, and the other image (color image) is formed in the active matrix regions 156 to 158. Then, those images are synthesized in the screen 618.

In the case of using the display unit shown in FIG. 15 to the structure using the lenticular screen shown in FIG. 8 or the parallax barrier shown in FIG. 10, the active matrix regions 153 to 155 in which the images of R, G and B are formed are integrated as shown in FIG. 14 by the required number of images, and the respective images are formed in each pair of the respective matrix regions.

The above structure has the significance in that even though the number of formed images is increased, the load of the horizontal scanning control circuits is not increased.

(Tenth Embodiment)

Figure 16:
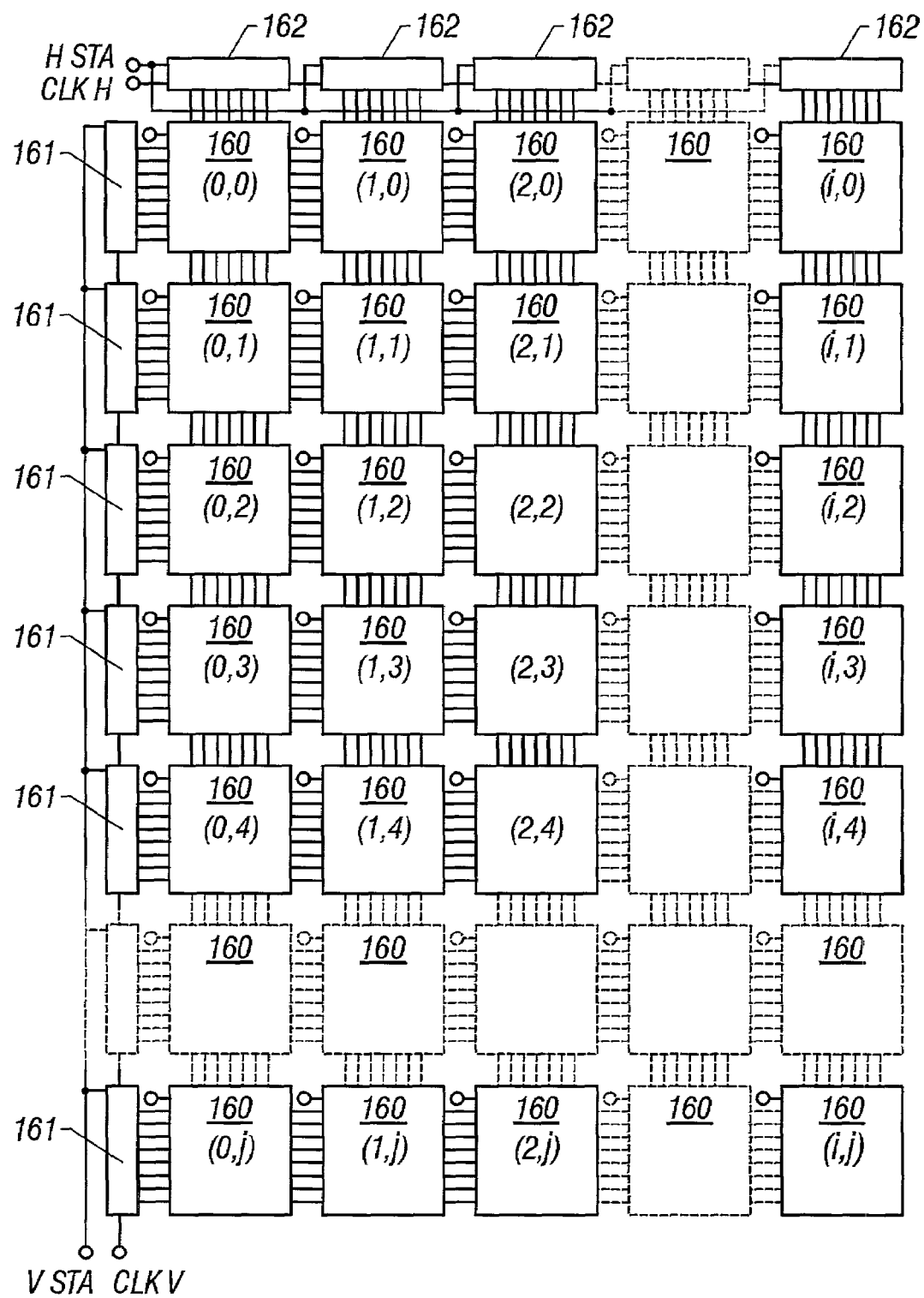
FIG. 16 is a diagram showing the structure of an integrated liquid-crystal panel.

A tenth embodiment shows still another example of the liquid-crystal panel shown in FIG. 14. FIG. 16 shows a structure of a liquid-crystal panel in accordance with this embodiment. What is shown in FIG. 16 is an example in which the active matrix regions 160 indicated by address (i, j) are integrated in the form of (i+1)×(j+1) matrixes. Even though the degree of integration is advanced, the number of the peripheral circuits is only (i+j+2).

As remarkably shown in FIG. 16, the peripheral circuits 161 and 162 are commonly disposed with respect to the respective active matrix regions, whereby even though a large number of active matrix regions are integrated, the number of the peripheral circuits is not increased as much as the increased number of the active matrix regions.

(Eleventh Embodiment)

An eleventh embodiment shows an example in which in an integrated liquid-crystal panel shown in FIG. 1, the active matrix regions that form images of R", G" and B" are further integrated. FIG. 7 shows the structure of the outline of the integrated active matrix type liquid-crystal panel in accordance with this embodiment.

Figure 17:
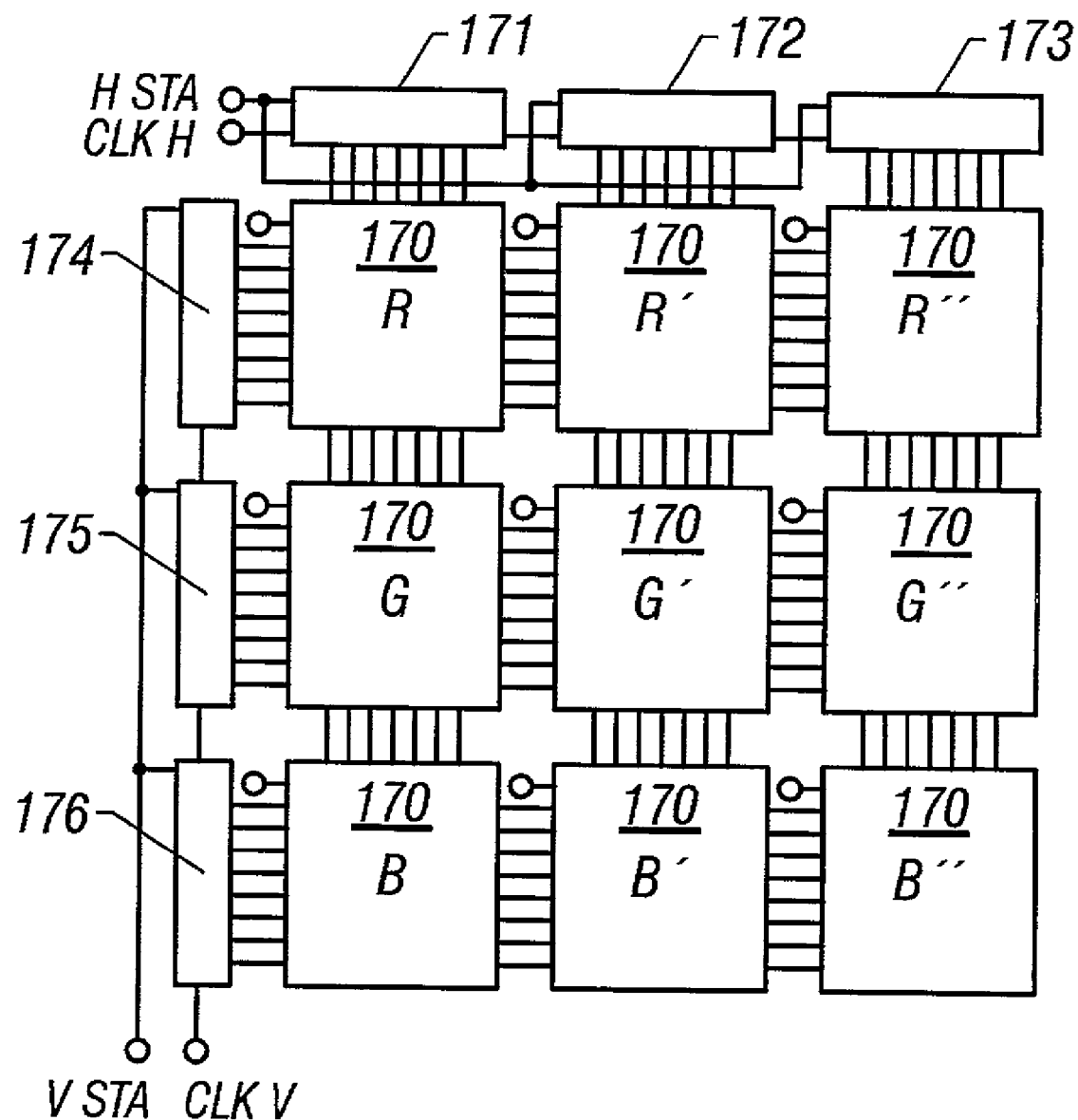
FIG. 17 is a diagram showing the structure of an integrated liquid-crystal panel.

As shown in FIG. 17, regardless of (3×3) active matrix regions 170 being integrated, the peripheral circuits may be made up of only horizontal scanning control circuits 171 to 173 and vertical scanning control circuits 174 to 176.

The structure shown in FIG. 17 can form color images consisting of RGB, R'G'B', R"G"B". If all the images are identical with each other, high luminance display can be performed. If the respective images are different from each other, different images can be superimposedly displayed on an identical screen.

(Twelfth Embodiment)

A twelfth embodiment relates to a display unit using a liquid-crystal panel which is capable of forming two pairs of images of RGB and integrated on an identical substrate. Using the display unit, a three-dimensional image can be displayed, and the image is displayed as two different images which can be recognized by different viewers, independently.

Figure 18:
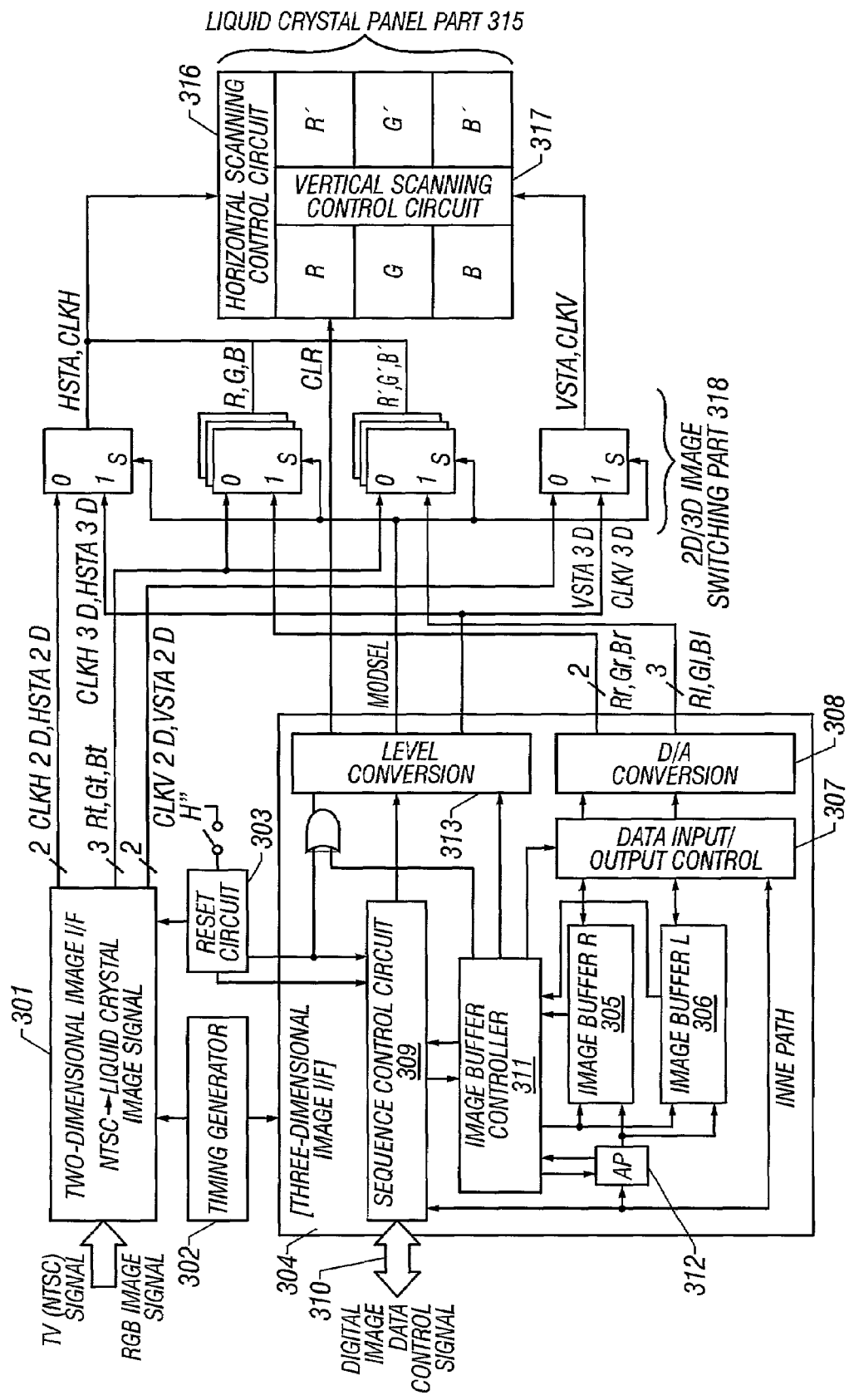
FIG. 18 is a diagram showing the outline of a control circuit in a display unit in accordance with this embodiment.

What is shown in FIG. 18 is a block diagram showing the structure for driving an integrated liquid-crystal panel shown in FIG. 14. The structure shown in FIG. 18 is a structure in which a two-dimensional image and a three-dimensional image are appropriately selected and displayed. In FIG. 18, a two-dimensional image I/F 301 has the function of converting a TV signal (NTSC signal) or an RGB image signal (two-dimensional image signal) which are inputted from the exterior into image signals $R_t$, $G_t$ and $B_t$ in synchronism with a timing of the system, and also the function of producing panel control signals HSTA2D, VSTA2D, CLKH2D and CLKV2D, which control the operation of the liquid-crystal panel.

A timing generator 302 generates the operating clocks of the system and the frequency-division clocks of the operating clocks.

A reset circuit 303 generates an initializing signal when a power is turned on, and a forced initializing signal in accordance with a request from a switch or a sequencer.

A three-dimensional image I/F 304 outputs image data written in an image buffer R 305 and an image buffer L 306 together with a control signal in synchronism with the operating rate of the liquid-crystal panel. Also, the image data Rr, Gr, Br, R1, G1 and B1 to be outputted are outputted through a data input/output controller 307 and a DA convertor 308 as an analog signal.

A sequence control circuit 309 interprets commands inputted from an external bus 310 and conducts writing of the command in the image buffer memories 305 and 306, and the setting of a read mode. Also, the sequence control circuit 309 conducts the confirmation of the operating state due to reading, and a processing responsive to the forced reset request.

An image buffer controller 311 conducts the writing of image data in the image buffer memories 305 and 306 in accordance with a request from the sequencer 309, and the output control of image data in synchronism with the operating rate clock of the liquid-crystal panel.

An AP 312 (address pointer) is a pointer that indicates a physical address of the image buffer memories 305 and 306. In this example, control such as increment is performed by the image buffer controller 311.

Reference numeral 313 denotes a level conversion circuit that converts the respective output signals of the reset circuit 303, the sequence control circuit 309 and the image buffer controller 311 to predetermined levels and outputs those converted signals to the exterior.

In this example, the three-dimensional image I/F 304 is provided to generate two pairs of RGB signals for right eye and left eye. Hence, those two pairs of RGB signals are basically different from each other (it is needless to say that there is a case in which they are identical).

Also, in the case where two pairs of RGB signals are a complete identical signal, the identical images are superimposed on each other. Hence, normal two-dimensional image data is displayed. In this case, a two-dimensional image with high luminance and high resolution can be obtained.

In FIG. 18, CLKH2D denotes the operating clock of the horizontal scanning control circuit for conducting a two-dimensional display HSTA2D denotes a horizontal scanning timing enable signal for conducting a two-dimensional display. Further, HSTA3D denotes a horizontal scanning timing enable signal for conducting a three-dimensional display.

$R_t$, $G_t$ and $B_t$ denote image data of two-dimensional images such as a normal TV image. CLKV2D denotes the operating clock of a vertical scanning control circuit for conducting two-dimensional display. VSTA2D denotes a vertical scanning timing enable signal for conducting two-dimensional display.

MODSEL denotes a mode selector. The mode selector has the function of switching display mode between two-dimensional display and three-dimensional display. In the structure shown in the figure, the two-dimensional display is conducted in a state where the mode selector is inoperative.

VSTA3D denotes a vertical scanning timing enable signal for conducting three-dimensional display. CLKV3D denotes the operating clock of a vertical scanning control circuit for conducting three-dimensional display.

$R_r$, $G_r$ and $B_r$ denote RGB image data for right. $R_1$, $G_1$ and $B_1$ denote RGB image data for left.

CLR denotes a reset signal which resets a circuit of a liquid-crystal panel portion 315. In FIG. 14, although a wiring through which a CLR signal is transmitted is omitted, a wiring is in fact formed in such a manner that the CLR signal is transmitted to the respective flip flop circuits of the horizontal scanning control circuit 316 and the vertical scanning control circuit 317 (omitted for prevention of complicated figure).

In the structure shown in FIG. 18, an image signal is selected in a 2D/3D image switching section 318, thereby being capable of selecting and displaying the 2D display and the 3D display. In other words, one display unit enables the two-dimensional display and the three-dimensional display to be selected and displayed. For example, a normal TV image transmitted by analog signals can be displayed, and a three-dimensional computer graphics image transmitted by digital signals can be also displayed.

Figure 19A:
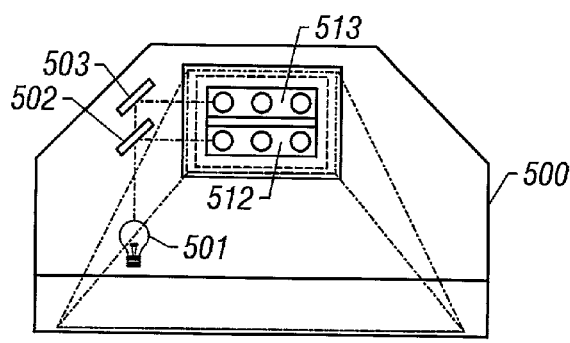
FIGS. 19A to 19C are diagram showing the outline of a projection-type liquid-crystal display unit.
Figure 19B:
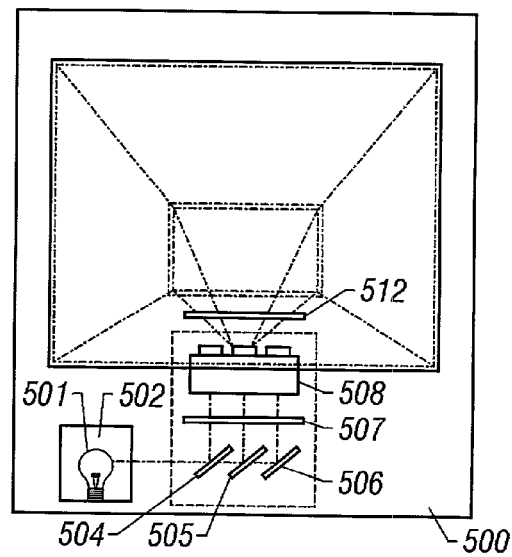
Figure 19C:
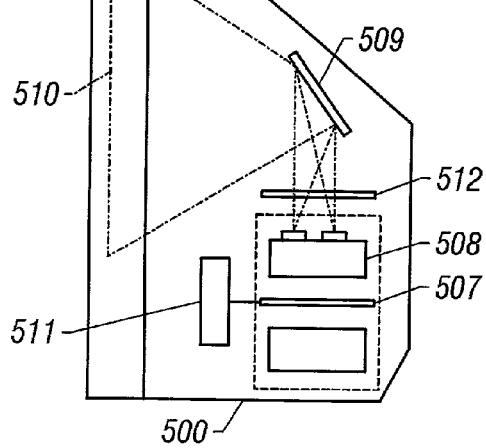

FIGS. 19A to 19C shows the outline of a display unit using the integrated liquid-crystal panel shown in FIG. 14. In FIGS. 19A to 19C, reference numeral 500 denotes a casing of the device, and an image enlarged and projected from the interior is displayed on a screen 510 disposed in the casing 500.

This example shows the structure in which an image is viewed from the opposite side of an image-projected plane of the screen 510 (in general, called "rear projection"). The basic structure is identical with a structure in which an image is viewed from an image-projected plane of the screen 510 (in general, called "projection-type projection") except that the image is inverse. It should be noted that they are different in that the projection-type projection has a casing and a screen which are not integrated.

A two-dimensional/three-dimensional image control circuit 511 an outline of which is shown in FIG. 18 is incorporated into the casing 500, thereby being capable of appropriately selecting and displaying the two-dimensional image and the three-dimensional image. Also, reference numeral 507 denotes a liquid-crystal panel for forming an image, an outline of which is shown in FIG. 14.

In FIGS. 19A to 19C, a light from a light source 501 that emits a white light is first reflected by a half mirror 502, and then made spectral to lights having wavelength regions corresponding to G, B and R by dichroic mirrors 504, 505 and 506.

Similarly, a light reflected by a mirror 503 is made spectral to the respective wavelength regions of B (blue), G (green) and R (red) by dichroic mirrors not shown. In other words, two pairs of light beams (six rays in total) of RGB are produced by two pairs of dichroic mirrors for RGB.

Those light beams are made incident to an integrated liquid-crystal panel 507 an outline of which is shown in FIG. 14. Then, predetermined images are formed by optical modulating the light beams by the integrated liquid-crystal panel 507. In this example, two pairs of images of RGB are formed. Those images are projected on the screen 510 through the mirror 509 from the optical system 508, and then synthesized as a color image.

An enlarge-projection lens system is incorporated into the optical system 508. The lens system has a variety of parameters set so that the respective images can be superimposed on each other in the projection plane 510, and also its arranging method is decided.

Further, a specific polarizing state is given to the respective images projected from the optical system 508 by the polarizing plates 512 and 513. In this example, two straightly polarized states different from each other by 90° are given to the respective images.

A pair of images to which different polarizing states are given are images of RGB which are formed in the active matrix regions 153, 154 and 155 shown in FIG. 14 and images of R'G'B' which are formed in the active matrix regions 156, 157 and 158.

In other words, the straight polarization state given the images of RGB formed in the active matrix regions 153, 154 and 155 shown in FIG. 14, and the straight polarization state given the images of R'G'B' formed in the active matrix regions 156, 157 and 158 are different in polarizing direction by 90°.

Hereinafter, a description will be given of the structure in which two different three-dimensional images are displayed using the display unit shown in FIG. 19, and different three-dimensional images can be viewed by two viewers.

Figure 20:
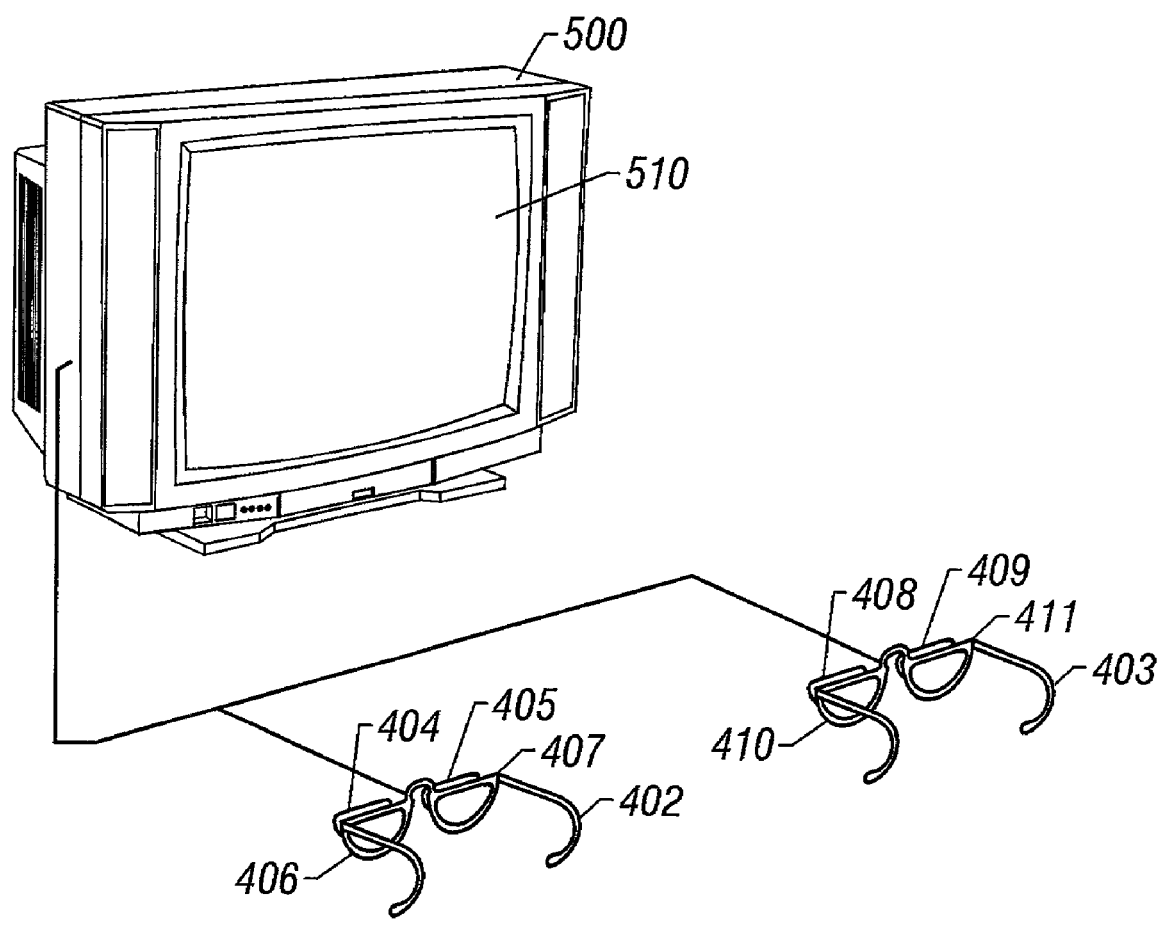
FIG. 20 is a diagram showing a structure, through which being capable of viewing a three-dimensional image, individually.

FIG. 20 shows the outline of that structure. What is shown in FIG. 20 is a structure in which images projected on the projected plane 510 of the display unit shown in FIG. 19A to 19C are viewed using specific glasses 402 and 403, thereby being capable of viewing different three-dimensional images by the respective viewers.

Figure 21:
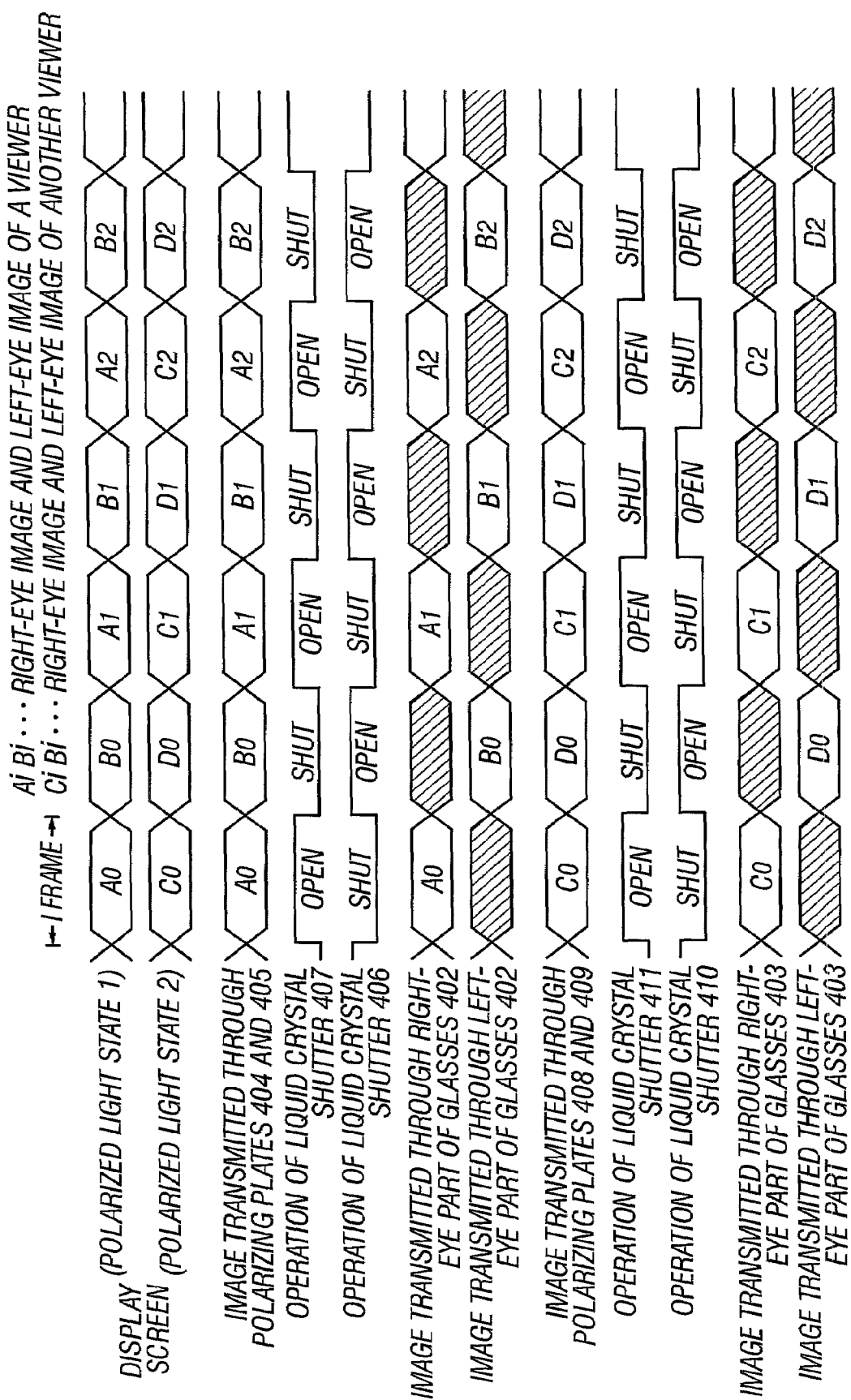
FIG. 21 is a timing chart used in the case of viewing a three-dimensional image, individually.

To achieve the above display, the device may be operated in accordance with the operating chart shown in FIG. 21.

The method shown in FIG. 21 is that the color images $A_i$ and $B_i$ formed in the active matrix regions 153 to 155 of FIG. 14, and the color images $C_i$ and $D_i$ formed in the active matrix regions 156 to 158 are recognized by a viewer who puts on the glasses 402 and a viewer who puts on the glasses 403, individually.

Figure 22:
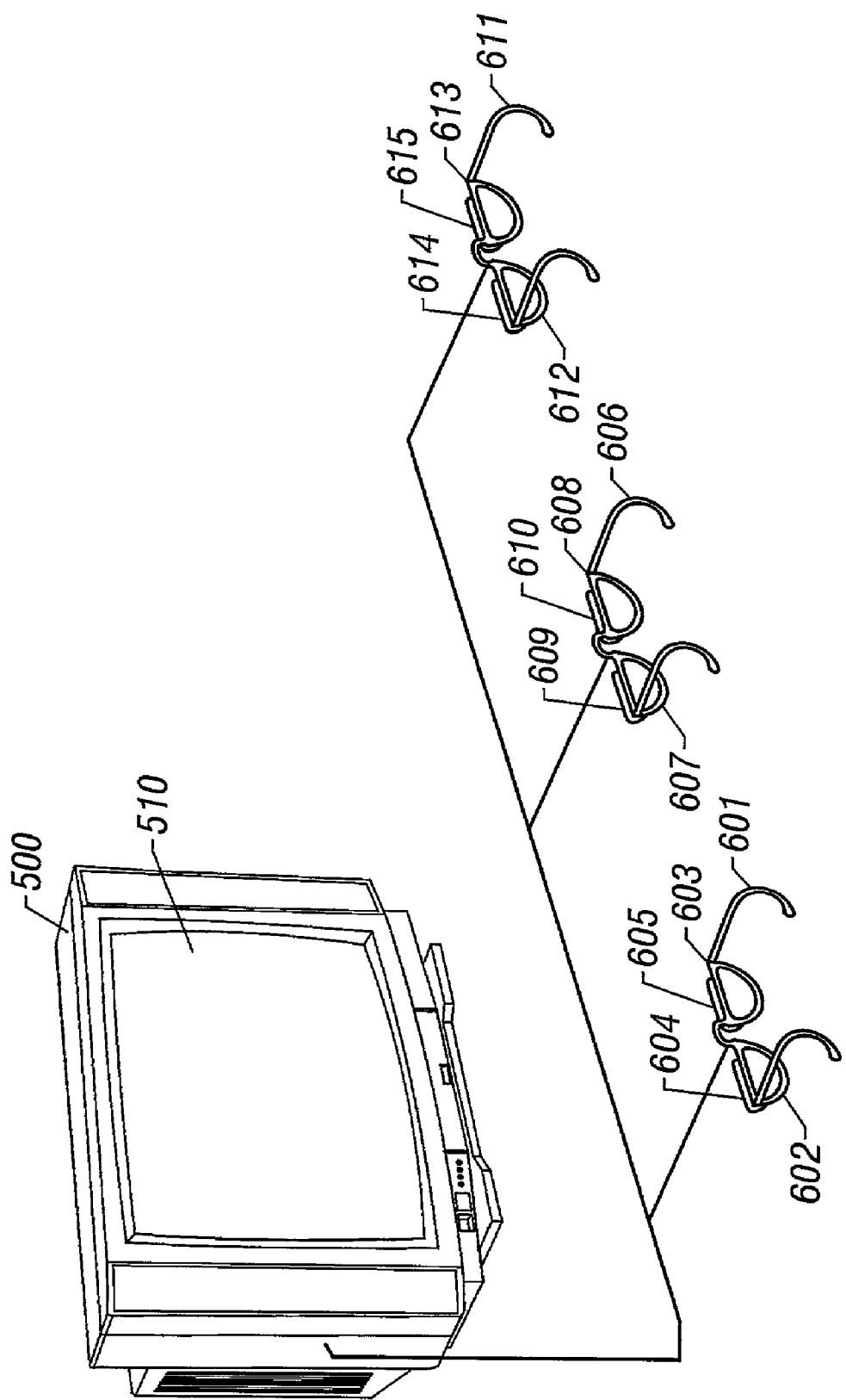
FIG. 22 is a diagram showing the structure, through which being capable of viewing a three-dimensional image, individually.

As shown in FIG. 22, the image $A_iB_i$ is made up of an image $A_i$ for right eye and an image $B_i$ for left eye, where i is a natural number including 0. The image $A_iB_i$ is converted into a straightly polarized light having a predetermined direction by the polarizing plate 512 of FIGS. 19A to 19C, and is then projected on the screen 510. Also, the image $A_i$ and the image $B_i$ are alternately displayed every one frame.

Similarly, the image $C_iD_i$ is made up of an image $C_i$ for right eye and an image $D_i$ for left eye, where i is a natural number including 0. The image $C_iD_i$ is converted into a straightly polarized light having a direction different from the image $A_iB_i$ by 90° by the polarizing plate 513 of FIGS. 19A to 19C, and is then projected on the screen 510. Also, the image $C_i$ and the image $D_i$ are alternately displayed every one frame.

The image $A_iB_i$ and the image $C_iD_i$ are superimposedly projected on the screen 510. In other words, the respective image data of the polarizing state 1 and the polarizing state 2 exhibited on the display screen of FIG. 21 are displayed simultaneously.

The respective displays are observed by the glasses 402 and 403, individually. The glasses 402 include polarizing plates 404 and 405 the polarizing directions of which are decided so as to transmit the polarizing state given by the polarizing plate 512. In other words, the polarizing plates 404 and 405 are made up of polarizing plates having the identical polarizing direction.

In the glasses 402 with the above structure, the images $A_0$, $B_0$, $A_1$, $B_1$, $A_2$, $B_2$, ... exhibited by the polarizing state 1 in FIG. 21 are transmitted by the polarizing plates 404 and 405.

The glasses 402 include optical shutters (liquid-crystal shutters in the case of this embodiment) 406 and 407 in the rear of its polarizing plates 404 and 405. It should be noted that an attention must be paid to the polarizing direction of the polarizing plates disposed in the liquid-crystal shutters in the case of employing the straightly polarized light. In order to prevent this problem, the liquid-crystal shutter may be structured using the dispersion-type liquid-crystal panel with no use of a polarizing plate.

The liquid-crystal shutter 407 is opened/shut in synchronism with the display of the image so as to transmit the images $A_0$, $A_1$, $A_2$, ...

The liquid-crystal shutter 406 is opened/shut in synchronism with the display of the image so as to transmit the images $B_0$, $B_1$, $B_2$, ...

As a result, the images $A_0$, $A_1$, $A_2$, ... are selectively viewed on the right eye of the glasses 402, and the images $B_0$, $B_1$, $B_2$, ... are selectively viewed on the left eye of the glasses 402.

In this manner, the three-dimensional image $A_iB_i$ can be selectively viewed in the glasses 402.

On the other hand, in the glasses 403, the polarizing plates 408 and 409 have their polarizing direction set so as to transmit the images of the polarizing state given by the polarizing plate 513. Hence, the images $C_0$, $D_0$, $C_1$, $D_2$ ... are transmitted by the polarizing plates 408 and 409.

Then, the liquid-crystal shutters 410 are operated at a timing shown in FIG. 22, thereby being capable of selectively viewing the images $C_0$, $C_1$, ... on the right eye portion of the glasses 403, and also selectively viewing the images $D_0$, $D_1$, ... on the left eye portion of the glasses 403.

In this manner, the three-dimensional image $C_iD_i$ can be selectively viewed in the glasses 403.

As a result, the different three-dimensional images can be viewed by the respective viewers who put on the glasses 402 and the glasses 403 simultaneously.

In this embodiment, a given polarizing state is a straight polarization. However, in the case of using the straight polarization, there arises such a problem that when the glasses are inclined, the plane of polarization is displaced with the result that the filter effect is lowered. In order to solve this problem, clockwise polarization and counter-clockwise circular polarization may be employed as the polarizing state.

In other words, clockwise circular polarization is given to the image $A_iB_i$, and counterclockwise circular polarization is given to the image $C_iD_i$. The glasses 402 selectively transmits clockwise circular polarization, and the glasses 403 selectively transmits counterclockwise circular polarization.

Also, to facilitate the viewing of an image, it is effective that a period of time where the liquid-crystal shutter is opened is shorter than a display time for one-frame image which is divided with time.

The structure shown in this embodiment becomes a normal two-dimensional image display unit without any modification. In other words, the 2D image and the 3D image are switched by the 2D/3D image switching section in the structure shown in FIG. 18, thereby being capable of displaying a normal TV image or video image.

Similarly, in this case, two independent images can be displayed. In the normal display for a two-dimensional image, when two independent images are displayed, the liquid-crystal shutter of the glasses is always in open-state so that time-division display is not performed.

Moreover, the positional relation between the liquid-crystal shutter and the polarizing plate in this embodiment may be converted. Even though the positional relation between the liquid-crystal shutter and the polarizing plate is converted, an image which is finally viewed by the right eye or the left eye is not changed.

Further, in this embodiment, the glasses are so arranged as to provide the polarizing plate and the liquid-crystal shutter plate. However, since the polarizing plates 404 and 405 have the identical direction, one large-sized polarizing filter may be arranged in front of a viewer who puts on the glasses without providing the polarizing filter in the glasses.

In this case, there is the significance that, even in the case of using straight polarization, even though the visual line of a viewer who puts on the glasses is inclined, the filter effect of the polarizing plate is not changed. However, this leads to such a defect that the visual position of the viewer who puts on the glasses is limited.

Further, in the operating method shown in FIG. 21, if time-division display is not conducted, that is, the images $A_iB_i$ for right eye and left eye are not formed, and the images $A_iB_i$ and the images $C_iD_i$ are made identical with each other, it has the same function as that of the normal TV receiver or display.

(Thirteenth Embodiment)

A thirteenth embodiment relates to a structure in which a plurality of three-dimensional images are separated by using time-division display, and the three-dimensional images displayed with time-division are further separated into an image for right eye and an image for left eye using the polarizing characteristic.

In the case of using the structure shown in this embodiment, the respective different three-dimensional images can be viewed by two or more viewers.

FIG. 20 shows the outline of the structure in accordance with this embodiment. As shown in the figure, similarly in this embodiment, an image is formed using the projection-type display unit shown in the FIGS. 19A to 19C with the liquid-crystal panel shown in FIG. 14.

The structure shown in FIG. 22 is that an image displayed on the screen 510 is viewed through the glasses 601, 606 and 611 having liquid-crystal shutters and polarizing plates, thereby being capable of viewing the respective different three-dimensional images. The open/shut operation of the liquid-crystal shutter is controlled in synchronism with a timing of the image displayed on the screen 510. In this example, a liquid-crystal shutter is used for the optical shutter. However, other means may be used instead if a predetermined operating speed is obtained, and the weight is light to the extent where no load is given to the viewer when using.

Figure 23:
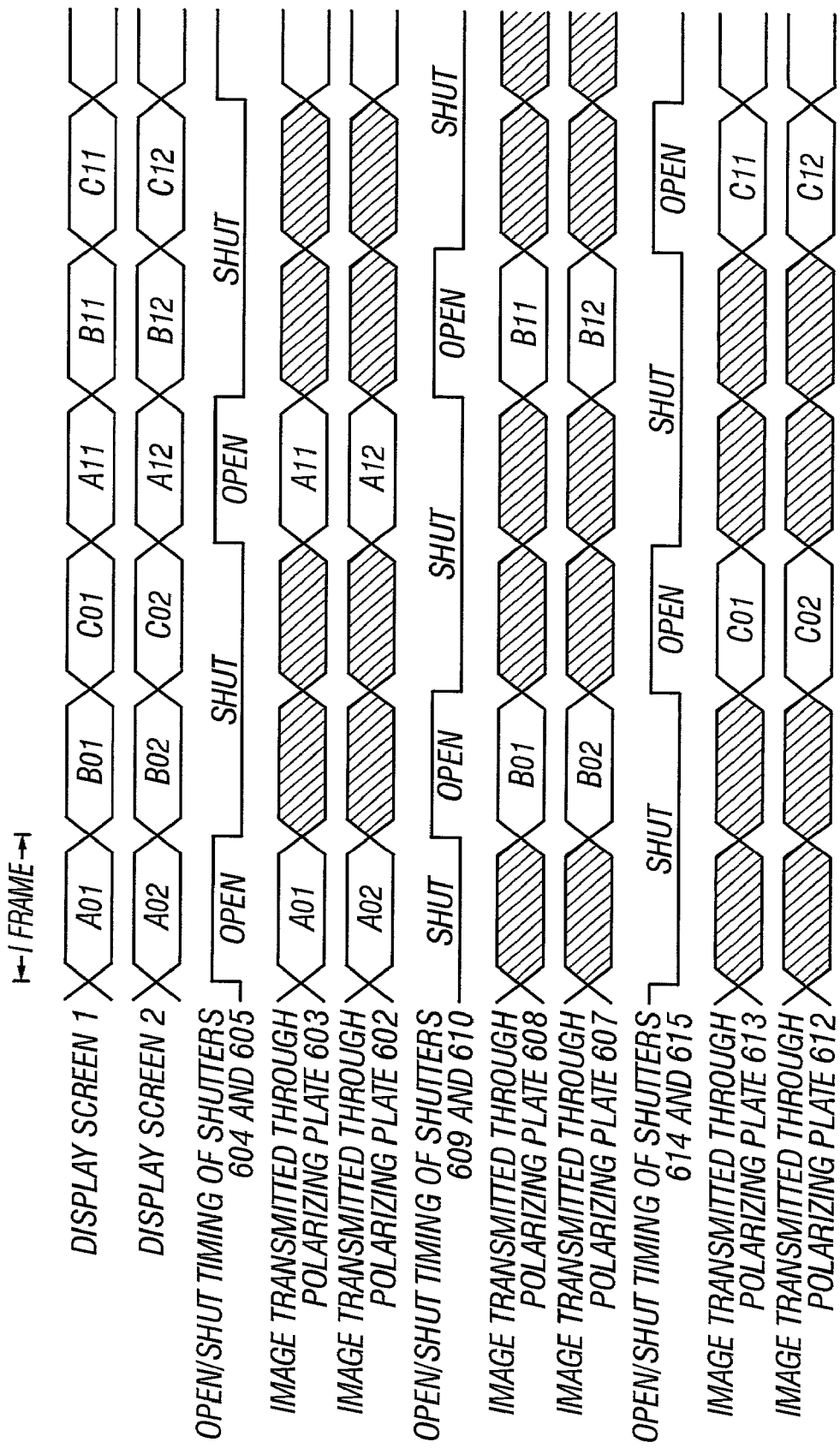
FIG. 23 is a timing chart used in the case of viewing a three-dimensional image, individually.

The structure of this embodiment is operated in accordance with the operation timing chart shown in FIG. 23. First, six kinds of images are displayed on the screen 510 as shown in the display screen of FIG. 23. In this example, images $A_{01}$, and $A_{02}$ are displayed in a state where they are superimposed on each other simultaneously. Similarly, images $B_{01}$ and $B_{02}$ as well as images $C_{01}$ and $C_{02}$ are displayed in a state where they are superimposed on each other simultaneously.

In the figure, it is preferable from the viewpoint of maintaining the image quality that one frame is set to 1/100 sec or shorter. Also, if the image quality equivalent to or more than the normal TV image or the like is maintained, it is preferable that the length of one frame is set to 1/180 sec, or shorter.

What are indicated by $A_{01}$ and $A_{02}$ are an image for right eye and an image for left eye which form the three-dimensional image, respectively. Similarly, what are indicated by $B_{01}$ and $B_{02}$ are an image for right eye and an image for left eye which form the three-dimensional image, respectively. Further, what are indicated by $C_{01}$ and $C_{02}$ are an image for right eye and an image for left eye which form the three-dimensional image, respectively.

A display screen 1 in FIG. 23 is directed to a color image formed in the active matrix regions 153 to 155 of FIG. 14. Also, a display screen 2 is directed to a color image formed in the active matrix regions 156 to 158 of FIG. 14.

The operating method of this embodiment is characterized in that the images of RGB formed in the active matrix regions 103 to 105 and 106 to 108 of FIG. 14 are three-dimensional images for right eye and three-dimensional images for left eye, which are divided with time, respectively.

In other words, in the active matrix regions 153 to 155, after one frame of the image $A_{01}$ for right eye for a three-dimensional image A is formed, one frame of the image $B_{01}$ for right eye for a three-dimensional image B is formed as a subsequent frame, and thereafter one frame of the image $C_{01}$ for right eye for a three-dimensional image C is formed.

On the other hand, in the active matrix regions 156 to 158, after one frame of the image $A_{02}$ for left eye for a three-dimensional image A is formed, one frame of the image $B_{02}$ for left eye for a three-dimensional image B is formed as a subsequent frame, and thereafter one frame of the image $C_{02}$ for right eye for a three-dimensional image C is formed.

Hence, even though only the images formed in a pair of active matrix regions 153 to 155 which are controlled by the common horizontal scanning control circuit 151 are viewed, only the images for right eye for the time-divided three-dimensional image can be viewed.

Similarly, even though only the images formed in a pair of active matrix regions 156 to 158 which are controlled by the common horizontal scanning control circuit 152 are viewed, only the images for left eye for the time-divided three-dimensional image can be viewed.

The above operation is operation in which the images for right eye for a plurality of three-dimensional images are formed with time-division in the active matrix regions which are commonly controlled by the horizontal scanning control circuit 151, and the images for left eye for a plurality of three-dimensional images are formed with time-division in the active matrix regions which are commonly controlled by the horizontal scanning control circuit 152.

Then, the images for right eye and left eye are displayed on the screen 510 simultaneously, and such display is conducted for three kinds of time-division displays.

Also, the images formed on the active matrix regions 153 to 155 are straightly polarized in a predetermined direction by the polarizing plate 512 of the display unit shown in FIGS. 19A to 19C.

The images formed on the active matrix regions 156 to 158 are straightly polarized at an angle different from a predetermined direction by 90° which is given by the polarizing plate 512, by the polarizing plate 513 of the display unit shown in FIGS. 19A to 19C.

In other words, the images $A_{01}$, $B_{01}$, $C_{01}$, $A_{11}$, $B_{11}$, $C_{11}$, ... are straightly polarized in a predetermined direction. Also, the images $A_{02}$, $B_{02}$, $C_{02}$, $A_{12}$, $B_{12}$, $C_{12}$, ... are straightly polarized in a direction different by 90° from the above predetermined direction.

Thereafter, the images displayed on the screen 510 are viewed by three viewers through specific glasses 601, 606 and 611 having the liquid-crystal shutters and the polarizing plates. In this situation, the liquid-crystal shutters disposed in the respective glasses are opened/shut simultaneously at the right and left eyes at a predetermined timing as shown in FIG. 23.

For example, the liquid-crystal shutters 604 and 605 of the glasses 601 are opened/shut so as to selectively transmit the three-dimensional image A. With the operation of the shutters 604 and 605, the images $A_{01}$ and $A_{02}$ which are superimposed on each other are made incident to the polarizing plates 602 and 603. The polarizing state of the image $A_{01}$ is a straight polarizing state having a predetermined direction by the polarizing plate 512. Also, the polarizing state of the image $A_{02}$ is a straight polarizing state having a direction different by 90° from the above predetermined polarizing state by the polarizing plate 513.

On the other hand, the polarizing plate 603 provided in the glasses 601 has its polarizing direction set so as to selectively transmit the polarizing state of the image $A_{01}$ which is made in a predetermined polarizing state by the polarizing plate 512.

Similarly, the polarizing plate 602 provided in the glasses 601 has its polarizing direction set so as to selectively transmit the polarizing state of the image $A_{02}$ which is made in a predetermined polarizing state by the polarizing plate 513.

That is, the polarizing plates 602 and 603 are disposed such that their polarizing directions are different from each other by 90°.

Also, the images $A_{01}$ and $A_{02}$ have the straight polarizing states the polarizing directions of which are different by 90°. Hence, the polarizing plate 602 selectively transmits the image $A_{02}$. However, the image $A_{01}$ is not transmitted by the polarizing plate 602.

On the other hand, the polarizing plate 603 selectively transmits the image $A_{01}$. However, the image $A_{02}$ is transmitted by the polarizing plate 603.

As a result, a viewer who puts on the glasses 601 can selectively view the image $A_{01}$ on his right eye, and the image $A_{02}$ on his left eye.

Through the same principle, the images $B_{01}$ and $B_{02}$ are transmitted by the liquid-crystal shutters 609 and 610 of the glasses 606, and the polarizing plate 607 is so arranged as to selectively transmit the image $B_{02}$ whereas the polarizing plate 608 is so arranged as to selectively transmit the image $B_{01}$. Then, a viewer who puts on the glasses 606 can selectively view the image $B_{01}$ on his right eye, and the image $B_{02}$ on his left eye.

Further, through the same principle, a viewer who puts on the glasses 611 can selectively view the image $C_{01}$ on his right eye, and the image $C_{02}$ on his left eye. In other words, he can view only image $C_{01}$ without viewing the image $C_{02}$ at his right eye, and can view only image $C_{02}$ without viewing the image $C_{01}$ at his left eye. In this manner, the respective viewers who put on the glasses 601, 606 and 611 can selectively view the different three-dimensional images A to C.

In this embodiment, since the time-divide images are three, three different three-dimensional images can be viewed. However, if the time-divided images are two, two different three-dimensional images can be viewed as in the twelfth embodiment. Further, if still more time-divided screens of three or more are formed, more different three-dimensional images can be viewed.

It should be noted that it is preferable to use the wireless system with electromagnetic waves or infrared rays as control means for the liquid-crystal shutter from a usable viewpoint.

Also, the positional relation between the liquid-crystal shutter and the polarizing plate in this embodiment may be reversed. Even though the positional relation between the liquid-crystal shutter and the polarizing plate is reversed, the image which is viewed by his right eye or left eye is finally identical.

For example, it is assumed that the polarizing plates 602 and 603 in the glasses 601 are disposed on the side of the screen 510. In this case, the images $A_{02}$, $B_{02}$, $C_{02}$, $A_{12}$, $B_{12}$ and $C_{12}$ are transmitted by the polarizing plate 602. Also, the images $A_{01}$, $B_{01}$, $C_{01}$, $A_{11}$, $B_{11}$ and $C_{11}$ are transmitted by the polarizing plate 603. Further, the images $A_{01}$ and $A_{02}$ are selectively transmitted by the liquid-crystal shutters 604 and 605. In other words, the image $A_{01}$ can be selectively viewed by his right eye, and the image $A_{02}$ can be selectively viewed by his left eye.

Further, this embodiment is designed so that the polarizing plate and the liquid-crystal shutter are provided in the glasses. However, since the liquid-crystal shutter disposed in a pair of glasses is operated at an identical timing, one large-sized liquid-crystal shutter may be arranged in front of the respective viewers who put on the glasses without providing the liquid-crystal shutter for the glasses.

In this case, only the polarizing plate is disposed on the glasses, and the structure in which the liquid-crystal shutter disposed in the glasses are controlled is not required.

The structure shown in FIG. 22 can be used as a TV receiver or a display on which the normal two-dimensional image is displayed as it is. Also, if the image $A_{01}$ for right eye and the image $A_{02}$ for left eye for the three-dimensional image are identical with each other, the structure in which the normal tow-dimensional screen can be observed by a plurality of viewers can be realized.

Since the above-mentioned various display methods can be switched by the control portion shown in FIG. 18, there is the significance that it is unnecessary to provide different devices for use.

The above significance is more useful when the integrated liquid-crystal panel as shown in FIG. 14 is used. In other words, because, as shown in FIG. 14, the peripheral circuits are commonly used, and the active matrix circuits and the peripheral drive circuits are integrated, the structure required for switching the above several display systems can be simplified. This is extremely significant in the reduction of the manufacturing costs and the improvement in the reliability.

(Fourteenth Embodiment)

A fourteenth embodiment relates to another structure of the integrated liquid-crystal panel shown in FIG. 14. The structure shown in FIG. 14 has such a function that two pairs of three images of R, G and B can be basically formed. Also, a plurality of different images or an image for a three-dimensional image of the time-division system can be formed by the drive method.

The integrated liquid-crystal panel described in this embodiment can form a color image with not three primary colors but four primary colors, or with a compensation color in addition to three primary colors.

What is shown in this embodiment is a structure in which a color image is formed with R (red), G (green), B (blue) and W (white). It should be noted that the primary colors necessary for conducting color display are not limited to the above structure, but can be appropriately set.

Figure 24:
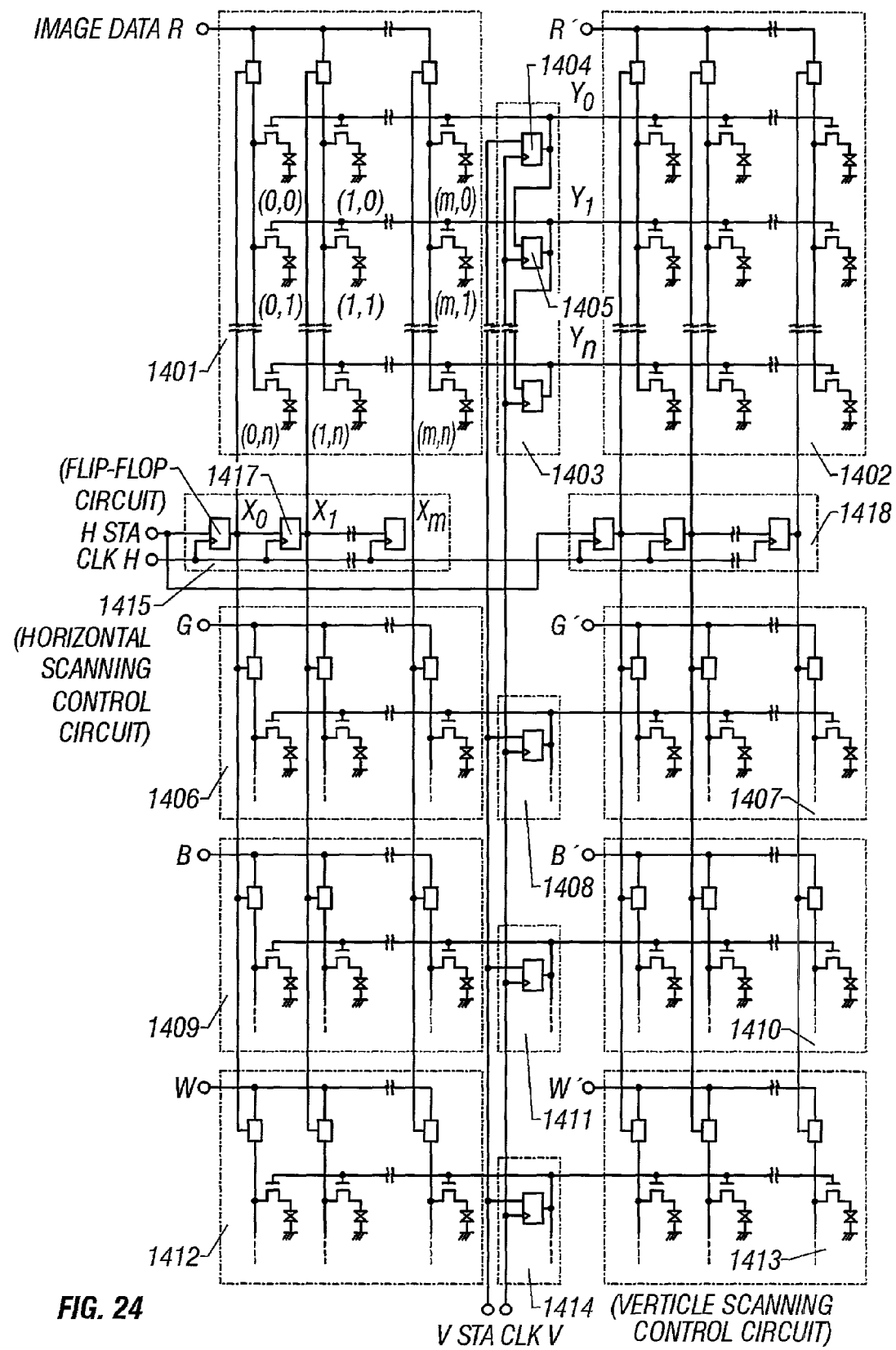
FIG. 24 is a diagram showing the structure of an integrated liquid-crystal panel.

FIG. 24 shows an integrated liquid-crystal panel in accordance with this embodiment. The structure shown in FIG. 24 includes, on a glass substrate or a quartz substrate, eight active matrix regions, and two horizontal scanning control circuits and four vertical scanning control circuits, for driving those active matrix regions.

In the structure shown in FIG. 24, a horizontal scanning control circuit 1415 for conducting the horizontal scanning of the active matrix region 1401 that forms the image for R (red), the active matrix region 1406 that forms the image for G (green), the active matrix region 1409 that forms the image for B (blue) and the active matrix region 1412 that forms the image for W (white), are commonly disposed with respect to those active matrix regions.

Also, the common horizontal scanning control circuit 1418 is disposed for the active matrix regions 1402 1407, 1410 and 1413 that form the images R', G', B', and W'.

The common vertical scanning control circuit 1403 is disposed for the active matrix regions 1401 and 1402 that form the images R and R'. Also, the common vertical scanning control circuit 1408 is disposed for the active matrix regions 1406 and 1407 that form the images G and G'. The common vertical scanning control circuit 1411 is disposed for the active matrix regions 1409 and 1410 that form the images B and B'. Further, the common vertical scanning control circuit 1414 is disposed for the active matrix regions 1412 and 1413 that form the images W and W'.

The basic operation is performed by sequentially operating, for example, the flip flop circuit 1416 and 1417 disposed in the horizontal scanning control circuit 1415, as shown in the twelfth embodiment. With this operation, the writing of information from address (0,0) to address (m,0) in the active matrix region 1401 is sequentially conducted, thereby forming an image of one frame.

With the application of the structure shown in FIG. 24, the image quality of the color image can be further enhanced. Also, since the vertical scanning control circuit 1414 is merely increased in comparison with the structure shown in FIG. 14, there is the significance that the structure is not complicated so much.

As was described above, using the difference in display timing, the difference in polarizing state, and the difference in the visual point, a plurality of images which are displayed on an identical screen can be viewed independently. The above structure can be used as means for providing a plurality of information simultaneously using an identical screen, means for selectively providing information to a specific person or direction, a play device, means for allowing a plurality of persons to view a plurality of image information independently, and so on.

In other words, in the method where a plurality of display screens on which an image is displayed are conventionally required, the number of display screens can be reduced to one. With this, the display screen can be increased in area, and the entire structure can be simplified.

Also, using the liquid-crystal panel where the active matrix regions on which a plurality of images can be formed independently are integrated on an identical substrate, the time-division system and the display method using the difference in the polarizing state are applied, thereby being capable of displaying two different three-dimensional images on the identical screen. Those two three-dimensional images can be viewed independently using the glasses including the optical shutter and the polarizing plate therein.

Also, using the method of displaying different images with time-division, thereby being capable of displaying two or more different three-dimensional images.

Further, the different images are not displayed, and all the images are made identical with each other, thereby being capable of conducting the same image display as that of the normal display unit. The switching of display can be simply conducted by switching the control circuit, thereby being capable of largely enhancing the general purpose property.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A projector having a liquid crystal display device comprising:
    a light source;
    a screen for providing a first image having a first polarizing state and a second image having a second polarizing state;
    a first optical system giving the first polarizing state to the first image between the light source and the screen;

a second optical system giving the second polarizing state to the second image between the light source and the screen; and a liquid crystal between the light source and the first and second optical systems, wherein the liquid crystal panel comprises:

a substrate;

a first active matrix region for the first image;

a first driving region conducting horizontal scanning control of said first active matrix region;

a second active matrix region for the second image; and a second driving region conducting horizontal scanning control of said second active matrix region, wherein said first active matrix region, said first driving region, said second matrix region and said second driving region are formed on said substrate.

2. A projector having a liquid crystal display device comprising:

a light source;

a screen for providing a first image having a first polarizing state and a second image having a second polarizing state;

a first optical system giving the first polarizing state to the first image between the light source and the screen;

a second optical system giving the second polarizing state to the second image between the light source and the screen; and a liquid crystal panel between the light source and the first and second optical systems, wherein the liquid crystal panel comprises:

a substrate;

a first active matrix region for the first image;

a first driving region conducting horizontal scanning control of said first active matrix region;

a second active matrix region for the second image;

a second driving region conducting horizontal scanning control of said second active matrix region; and a third driving region conducting vertical scanning control of said first and second active matrix regions, wherein said first active matrix region, said first driving region, said second matrix region, said second driving region and said third driving region are formed on said substrate.

3. A projector having a liquid crystal display device comprising:

a light source;

a screen for providing a first image having a first polarizing state and a second image having a second polarizing state;

a first optical system giving the first polarizing state to the first image between the light source and the screen;

a second optical system giving the second polarizing state to the second image between the light source and the screen; and a liquid crystal panel between the light source and the first and second optical systems, wherein the liquid crystal panel comprises:

a substrate;

a first active matrix region for the first image;

a first driving region conducting horizontal scanning control of said first active matrix region;

a second active matrix region for the second image; and a second driving region conducting horizontal scanning control of said second active matrix region, wherein said first active matrix region, said first driving region, said second matrix region and said second driving region are formed on said substrate, and wherein the first image and the second image are viewed on a right eye and a left eye of a viewer, respectively.

4. A projector according to claim 3, wherein display of the first image and display of the second image are alternated every 1/60 seconds or shorter.

5. A projector comprising:

a light source;

a mirror reflecting a first image and a second image;

a first optical system giving a first polarizing state to the first image between the light source and the mirror;

a second optical system giving a second polarizing state to the second image between the light source and the mirror;

a screen for providing the first image having the first polarizing state and the second image having the second polarizing state; and a liquid crystal panel between the light source and the first and second optical systems, wherein the liquid crystal panel comprises:

a substrate;

a first active matrix region for the first image;

a first driving region conducting horizontal scanning control of said first active matrix region;

a second active matrix region for the second image; and a second driving region conducting horizontal scanning control of said second active matrix region, wherein said first active matrix region, said first driving region, said second matrix region and said second driving region are formed on said substrate, and wherein the first image and the second image overlap on the screen.

6. A projector comprising:

a light source;

a mirror reflecting a first image and a second image;

a first optical system giving a first polarizing state to the first image between the light source and the mirror;

a second optical system giving a second polarizing state to the second image between the light source and the mirror;

a screen for providing the first image having the first polarizing state and the second image having the second polarizing state; and a liquid crystal panel between the light source and the first and second optical systems, wherein the liquid crystal panel comprises:

a substrate;

a first active matrix region for the first image;

a first driving region conducting horizontal scanning control of said first active matrix region;

a second active matrix region for the second image; and a second driving region conducting horizontal scanning control of said second active matrix region, a third driving region conducting vertical scanning control of said first and second active matrix regions, wherein said first active matrix region, said first driving region, said second matrix region, said second driving region and said third driving region are formed on said substrate, and wherein the first image and the second image overlap on the screen.

7. A projector comprising:

a light source;

a mirror reflecting a first image and a second image;

a first optical system giving a first polarizing state to the first image between the light source and the mirror;

a second optical system giving a second polarizing state to the second image between the light source and the mirror;
a screen for providing the first image having the first polarizing state and the second image having the second polarizing state; and
a liquid crystal panel between the light source and the first and second optical systems,
wherein the liquid crystal panel comprises:
a substrate;
a first active matrix region for the first image;
a first driving region conducting horizontal scanning control of said first active matrix region;
a second active matrix region for the second image; and
a second driving region conducting horizontal scanning control of said second active matrix region,
wherein said first active matrix region, said first driving region, said second matrix region and said second driving region are fonned on said substrate,
wherein the first image and the second image are viewed on a right eye and a left eye of a viewer, respectively, and
wherein the first image and the second image overlap on the screen.

* * * * *